(12) United States Patent
Mansurov et al.

(10) Patent No.: US 6,346,945 B1
(45) Date of Patent: Feb. 12, 2002

(54) METHOD AND APPARATUS FOR PATTERN-BASED FLOWCHARTING OF SOURCE CODE

(75) Inventors: Nikolai Mansurov, Moscow (RU); Djenana Campara; Norman Rajala, both of Nepean (CA)

(73) Assignee: KLOCwork Solutions, Nepean (CA)

( * ) Notice: Subject to any disclaimer, the term of this patent is extended or adjusted under 35 U.S.C. 154(b) by 0 days.

(21) Appl. No.: 09/220,859

(22) Filed: Dec. 28, 1998

(51) Int. Cl.[7] .............................................. G06T 13/00
(52) U.S. Cl. .......................................... 345/473; 717/7
(58) Field of Search ......................... 345/473; 395/500, 395/707; 382/173; 364/300; 709/1; 717/7, 5

(56) References Cited

U.S. PATENT DOCUMENTS

| | | | |
|---|---|---|---|
| 4,455,619 A | 6/1984 | Masui et al. | 364/900 |
| 4,667,290 A * | 5/1987 | Goss et al. | 364/300 |
| 4,885,717 A | 12/1989 | Beck et al. | 364/900 |
| 5,187,788 A | 2/1993 | Marmelstein | 395/700 |
| 5,191,646 A | 3/1993 | Naito et al. | 395/161 |
| 5,442,738 A | 8/1995 | Chapman et al. | 395/135 |
| 5,513,305 A | 4/1996 | Maghbouleh | 395/145 |
| 5,592,600 A | 1/1997 | De Pauw et al. | 395/140 |
| 5,768,564 A * | 6/1998 | Andrews et al. | 395/500 |
| 5,836,014 A * | 11/1998 | Fairman, Jr. | 395/707 |
| 5,845,125 A * | 12/1998 | Nishimura et al. | 717/4 |
| 6,031,993 A * | 2/2000 | Andrew et al. | 395/707 |
| 6,081,617 A * | 6/2000 | Bangham et al. | 382/173 |
| 6,131,109 A * | 10/2000 | Ueki et al. | 709/107 |
| 6,151,618 A * | 11/2000 | Wahbe et al. | 709/1 |

FOREIGN PATENT DOCUMENTS

CA 2144483 10/1995

* cited by examiner

*Primary Examiner*—Mark Zimmerman
*Assistant Examiner*—Huedung X. Cao

(57) ABSTRACT

A system and method for generating a consistent graphical expression of source code which is independent of the source language and of a particular programmer's style. The system first provides an intermediary pattern language which is source language independent into which the source code is translated. This pattern language is directly mapped to a set of predetermined graphical patterns having a series of attributes. The pattern language is nested in the sense that certain expressions may contain certain other expressions. This translates directly to graphical containment. Attributes are computed starting with the most nested parts of the pattern language translation. The attributes of the more nested parts having been thus computed may be used in the computation of the attributes of less nested parts of the expression. Once all attributes are computed, a mapping to display directives is performed, and a graphical engine produces an actual display.

8 Claims, 18 Drawing Sheets

SECTION DIAGRAM

PROCEDURE DIAGRAM

DATA DEFINITION

PROCEDURE DEFINITION

MACRO DEFINITION

COMMENT

| RECORD | NODE TYPE | POINTER 1 | POINTER 2 | POINTER 3 | NESTING DEPTH | CENTER. W | CENTER. H | SIZE. W | SIZE. H |
|---|---|---|---|---|---|---|---|---|---|
| 1 | 1 | P>A1 | P>A5 | P>2 | 0 | | | | |
| 2 | 2 | P>3 | | | 1 | | | | |
| 3 | 3 | P>A2 | P>4 | | 2 | | | | |
| 4 | 2 | P>6 | | | 3 | | | | |
| 5 | 2 | P>9 | | | 3 | | | | |
| 6 | 4 | P>7 | | | 4 | | | | |
| 7 | 2 | P>8 | | | 5 | | | | |
| 8 | 5 | P>A3 | | | 6 | | | | |
| 9 | 5 | P>A4 | | | 4 | | | | |
| A1 | "MYPROC ( )" | | | | 1 | | | | |
| A2 | "(2>3)" | | | | 3 | | | | |
| A3 | "0" | | | | | | | | |
| A4 | "1" | | | | | | | | |
| A5 | " " | | | | | | | | |

FIG. 16

METHOD AND APPARATUS FOR PATTERN-BASED FLOWCHARTING OF SOURCE CODE

FIELD OF THE INVENTION

The invention relates to systems and methods for reverse engineering software and more particularly relates to a method and apparatus for pattern-based Flowcharting of source code.

BACKGROUND OF THE INVENTION

Source code is the most important object of the software engineering process. Significant effort is put into understanding source code through reverse engineering, and in fact understanding source code is the main issue of the reverse engineering process. Many existing tools are available which assist in understanding source code. These include tools which produce listings of source code and cross reference tools. There are many tools available today which are capable of producing various types of graphical representations of source code. These include for example flowcharts which graphically illustrate control flow of individual procedures or functions, and class hierarchy diagrams which show inheritance relations between classes.

In reverse engineering tasks it would be desirable for any graphical diagrams created to have a uniform presentation style which is independent of the individual style of the original author of the source code. The reason is that the person performing the reverse engineering task is usually not the original author of the source code. Also, reverse engineering is usually performed across several software units which have different original authors.

Graphical diagrams usually consist of primitive graphical symbols connected with lines. Existing graphical tools are generally only capable of presenting and manipulating primitive graphical symbols and lines independently. This leads to a situation where graphical diagrams of source code are subject to individual layout style.

SUMMARY OF THE INVENTION

It is an object of the invention to obviate or mitigate one or more of the above mentioned disadvantages.

The invention provides systems and methods for extracting information from source code and presenting this information in the form of graphical diagrams which consist of predefined building blocks (called graphical patterns). Each graphical pattern consists of a number of primitive graphical symbols which are graphically arranged and connected with lines. An important characteristic of these graphical patterns is that they may contain predefined places where further patterns can be inserted recursively. These predefined places in the graphical patterns are called nested sockets.

The final appearance of a graphical pattern depends on the patterns inserted into the nested sockets. All layout and editing operations are applied to graphical patterns and not to individual primitive symbols and lines. A particular pattern is represented in the form of a set of formulae for the computation of layout attributes. When a graphical diagram of a particular source code construct is required, the source code entity is first converted into nested patterns and then the layout attribute computations are performed. The graphical diagram is created by further converting the nested patterns into display directives. The display directives when executed by a suitable graphical engine produce the desirable graphical image which can be scaled without re-evaluating layout attributes.

BRIEF DESCRIPTION OF THE DRAWINGS

FIG. 16 is a tabular version of the N-ary tree of FIG. 15.

DESCRIPTION OF THE PREFERRED EMBODIMENTS

Figure 1:
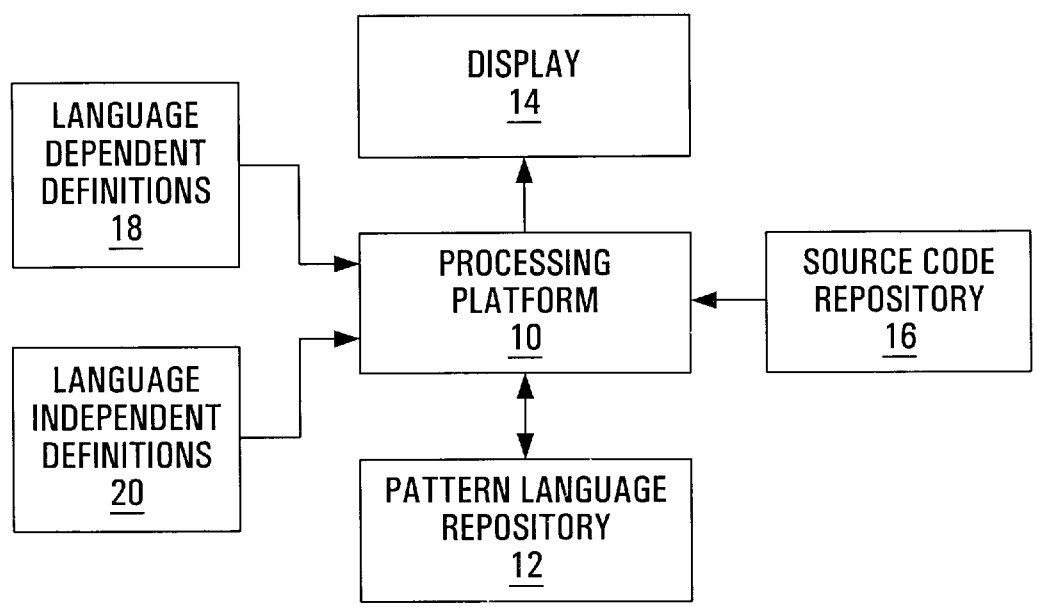
FIG. 1 is a block diagram of a pattern-based visualization system according to an embodiment of the invention.

FIG. 1 is a simplified block diagram of an apparatus according to an embodiment of the invention for use in generating graphical representations of source code. A general purpose processing platform 10 is connected to a pattern language repository 12 and a display 14. In addition, there is a source code repository 16 in which the source code to be graphically represented is stored. There is a set of language dependent definitions 18 accessible by the processing platform 10, and a set of language independent definitions 20 also accessible by the processing platform 10. The processing platform 10 may be any general purpose processing platform capable of running software implementing the flowchart generation methods described herein, for example a personal computer, or a mainframe to name a few examples. The source code repository 12 may be any conventional repository for source code. The pattern language repository 12 is preferably in random access memory for fast readability, but not necessarily be so. There may be a different language dependent definitions file 20 for each source language to be input for graphical representation. The language independent definitions file 18 contains definitions which are not a function of a particular source code. The language independent definitions file 18 and the language dependent definitions file 20 may be separate or combined entities. The information they contain may alternatively be encoded directly as part of the software running on the processing platform.

Figure 2A:
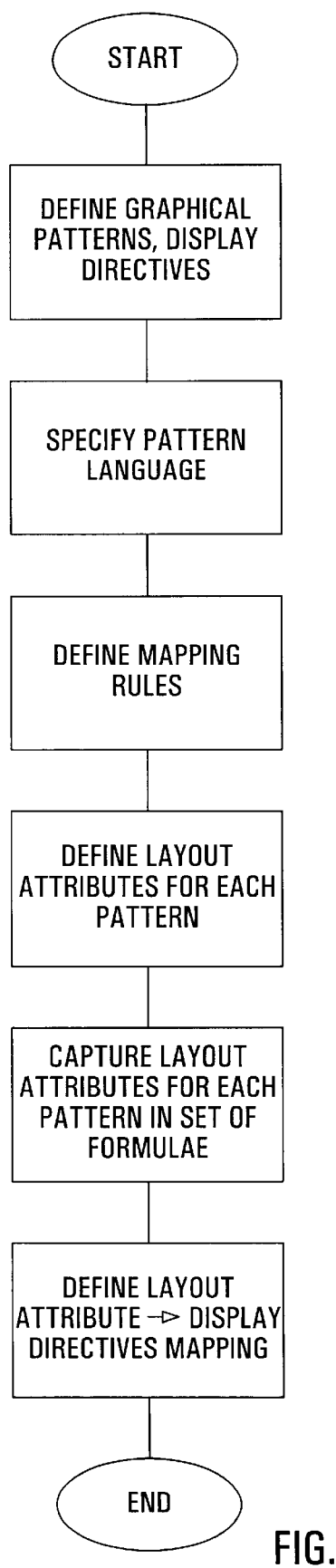
FIG. 2A is a flowchart of the steps performed in defining a particular implementation of the invention.

There are many ways of implementing the flowchart generation methods provided by embodiments of the invention. The steps in defining a particular implementation will be described by way of overview with reference to the flowchart appearing in FIG. 2A. The details of each of the steps appearing in this flowchart will be presented later.

To begin, graphical patterns must be defined. Any graphical representation will ultimately be composed of these graphical patterns, so the graphical patterns are the building blocks of the graphical representations. Each graphical pattern is source language independent and corresponds with structured programming constructs available in most programming languages. For example, almost all programming languages include some sort of IF-THEN-ELSE programming construct, and there would be a graphical pattern defined for this programming construct which is the same for all programming languages. The definitions of graphical patterns are part of the language independent definitions 18 of FIG. 1.

The next step is to specify a pattern language. A source code pattern language is an intermediate language which is the same for all source languages which is basically a common ground from which to start generating the graphical displays.

Next, a series of mapping rules need to be defined which permit a given source language to be translated into the above defined pattern language. These mapping rules will of course be source language dependent and form part of the language dependent definitions 18 of FIG. 2.

For each pattern, a series of layout attributes are defined. The attributes of a given pattern define a particular realization of the pattern. A set of formulae for computing these layout attributes must also be defined. These are source language independent.

Display directives must also be defined, or alternatively these may already be defined in an existing graphics package. Display directives are the lines, blocks etc. used to physically generate the graphical patterns. These are language independent.

Finally, a set of layout attribute to display directive mappings are defined, these enabling an actual graphical display to be generated from a set of defined layout attributes. These are source language independent.

Figure 2B:
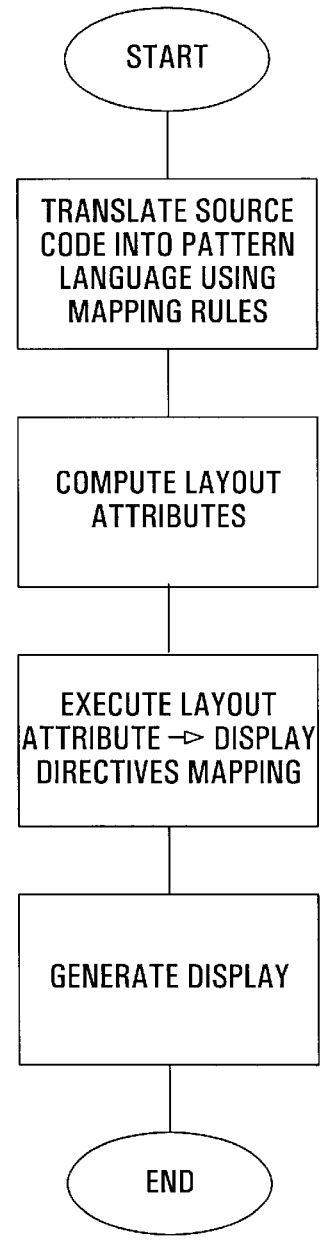
FIG. 2B is a flowchart of the steps executed in a pattern-based flowcharting method according to an embodiment of invention.

Now with reference to FIG. 2B, the steps carried out in generating a graphical representation of source code once a particular implementation of the invention has been defined will be described by way of overview. Further details are presented below.

To begin, the source code is translated into pattern language using the above defined mapping rules. Next, all of the layout attributes in the resulting pattern language are computed using the above referenced set of formulae. Next, the layout attribute to display directive mappings are executed and used to generate an actual display.

FIGS. 3, 4, 5, and 6 illustrate a complete set of graphical patterns which can be used to visualize source code in traditional imperative programming languages (e.g. C, Pascal, Modula-2, etc.). The actual graphical appearance of the suggested set of patterns can vary.

Figure 7:
FIG. 7 is an illustration of a set of display primitives for use in generating graphical display.
Figure 7:
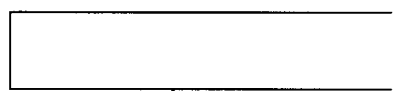
Figure 7:
Figure 7:
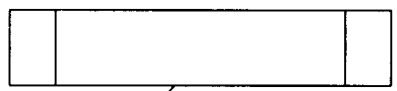
Figure 7:
Figure 7:
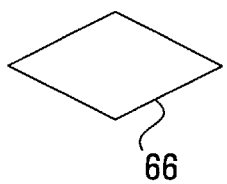
Figure 7:
Figure 7:
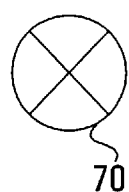
Figure 7:
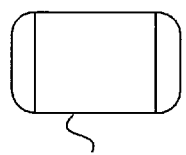
Figure 7:
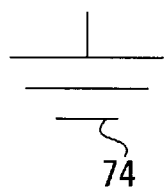

To enhance the understanding of graphical representation of patterns, various text regions may be added. In the illustrated embodiments, ovals are used to represent text regions. The contents of these region depends on the source code construct. Ovals with diagonal lines represent predefined text labels. The text of predefined labels is independent of source code constructs (but can depend on the source language). Star-like symbols with a frame represent nested sockets, i.e. variable size areas, which contain other patterns. It is important to understand that the star-like symbols for nested sockets are not actually displayed when a final flow chart is created nor is the frame in which it is shown. Rather, these are used to act as placeholders in the creation of the final flow chart which will contain some nested diagrams in accordance with the structure of the source code. Furthermore, the text regions and predefined labels are not part of the graphical pattern per se, but rather are simply part of a notation selected for describing the graphical pattern. Other lines belong to the patterns themselves. The actual appearance of each pattern may vary because of the nested patterns as well as because of the scale. Patterns may use colour to emphasize certain elements (e.g. continue lines in loops, labels, symbols containing function calls, local variable names, global variable names, etc). The display primitives used in patterns are illustrated in FIG. 7 and include a vertical line 50, horizontal line 52, text line 54, rectangle 56, open rectangle 58, rectangle with one double side 60, rectangle with two double sides 62, rectangle with a folded corner 64, rhomb 66, circle 68, return 70, start 72 and ground (finish) 74. These display primitives are described in detail below.

Figure 3:
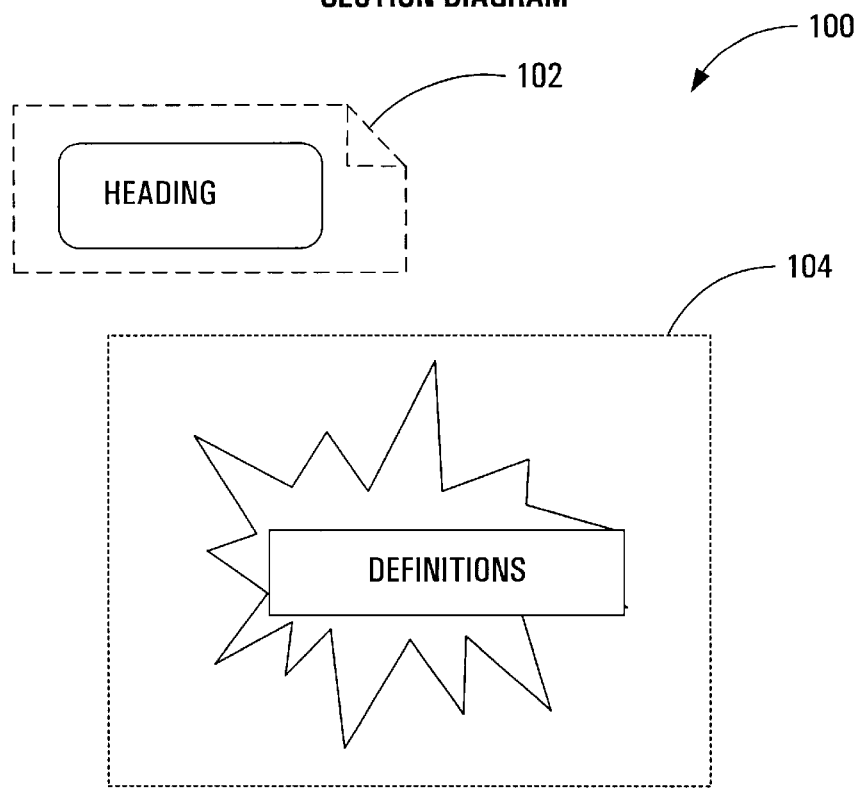
FIG. 3 is an illustration of a set of top-level patterns (section pattern and procedure pattern)
Figure 3:
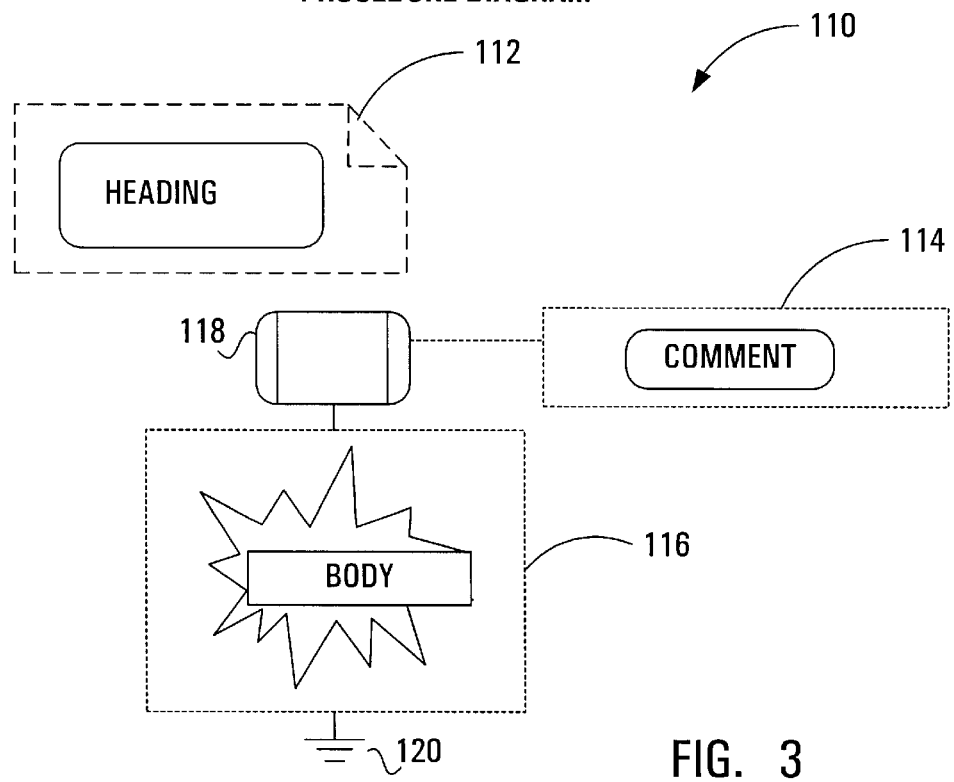

Referring next to FIG. 3 two top-level patterns are shown, one each for a section diagram pattern generally indicated by 100 (a section may be equivalent to a file in some systems), and a procedure diagram pattern generally indicated by 110. It is noted that an object-oriented language (e.g. C++, Java) will need an additional top-level pattern to represent class (class pattern).

The section diagram pattern 100 represents global definitions of a section. A heading region 102 contains the text which describes the section. A nested socket 104 labelled "Definitions" contains a vertically stacked list of primitive patterns relevant to the section. The primitive patterns of a section diagram will be described below with reference to FIG. 4. The nested patterns in the Definitions socket 104 correspond to entities defined in the section.

The procedure diagram pattern 110 represents a flowchart for a single procedure definition. A heading region 112 contains text which describes the procedure (procedure name and procedure signature including return type and parameter types). A comment region 114 contains comment text describing the procedure. A nested socket 116 labelled "Body" corresponds to the body of the procedure. This socket contains a vertically stacked list of composite (see FIG. 5) and primitive (see FIG. 5) patterns of a procedure diagram. Also shown are start and finish primitives 118, 120.

Figure 4:
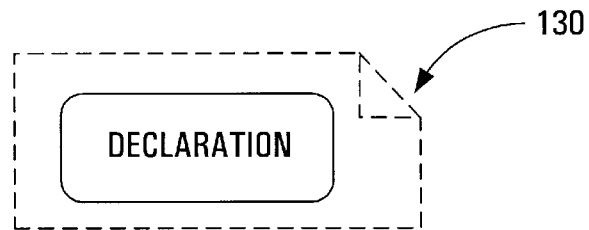
FIG. 4 is an illustration of a set of primitive patterns, which can be contained in the section diagram.
Figure 4:
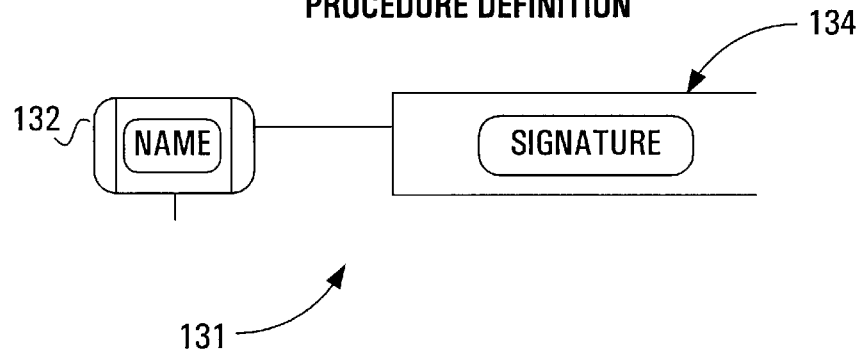
Figure 4:
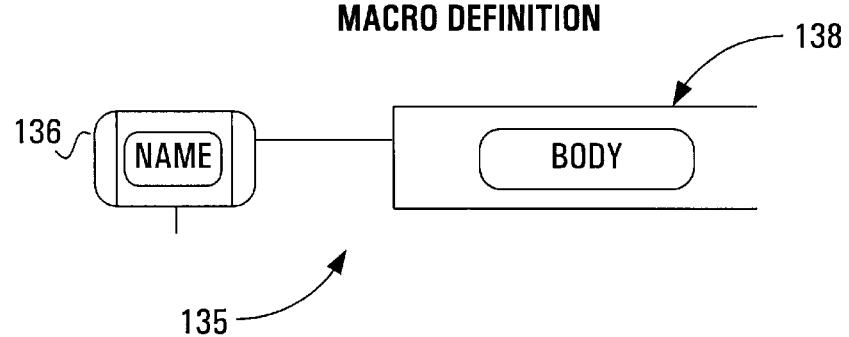
Figure 4:
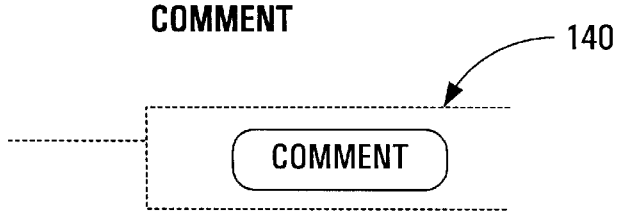

Referring next to FIG. 4, the primitive patterns which can be contained in the section diagram 100 of FIG. 3 will be described. A section diagram does not contain any composite patterns.

The data definition primitive pattern 130 represents a single data declaration. It consists a rectangle with a folded corner, and containing a single text region labelled "declaration" which contains the text of the data declaration.

The procedure definition primitive pattern is generally indicated by 131 and is used to represent a single procedure definition. It includes a name region 132 which contains a procedure name. It also includes an open rectangle 134 labelled "signature" which contains the procedure signature which may for example include the return type of the procedure if any and parameter types.

The macro definition primitive pattern is generally indicated by 135 and is used to represent a single macro definition. It includes a name region 136 which contains a macro name. It also includes an open rectangle 138 labelled "Body" which contains macro parameters and the body of the macro definition.

The comment primitive pattern 140 is used to represent a comment. It simply consists of a dotted line open rectangle with a text region labelled "comment" which corresponds to the text of the comment. Consecutive comments are preferably merged into a single comment pattern. The dotted lines are shown for the purpose of locating and sizing the comment. However, when displayed, preferably the comment primitive does not include these dotted lines.

Figure 5:
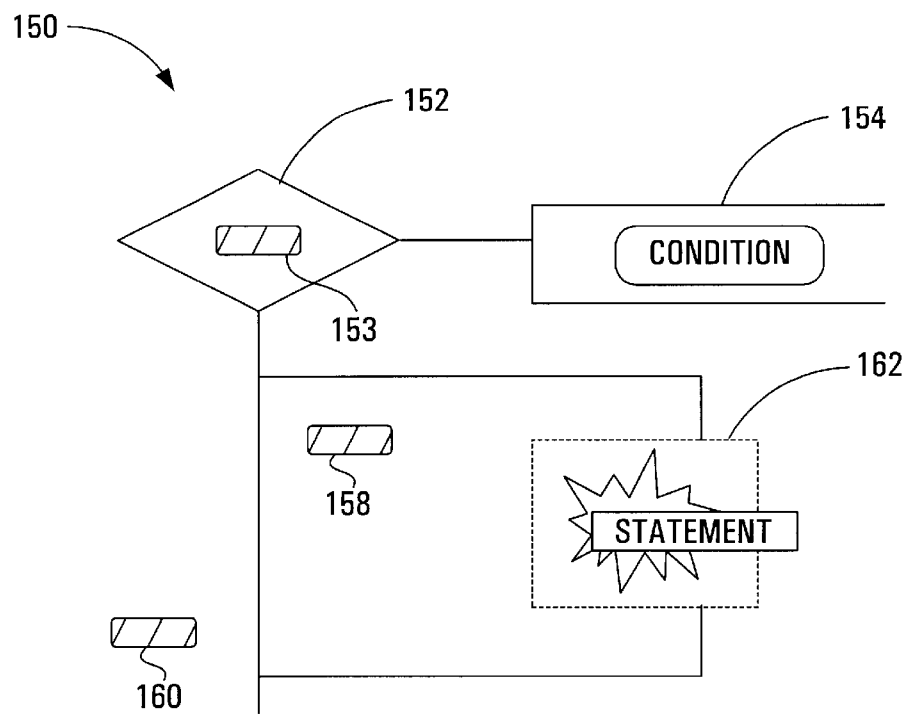
FIG. 5 is an illustration of composite patterns which can be contained in the procedure diagram.
Figure 5:
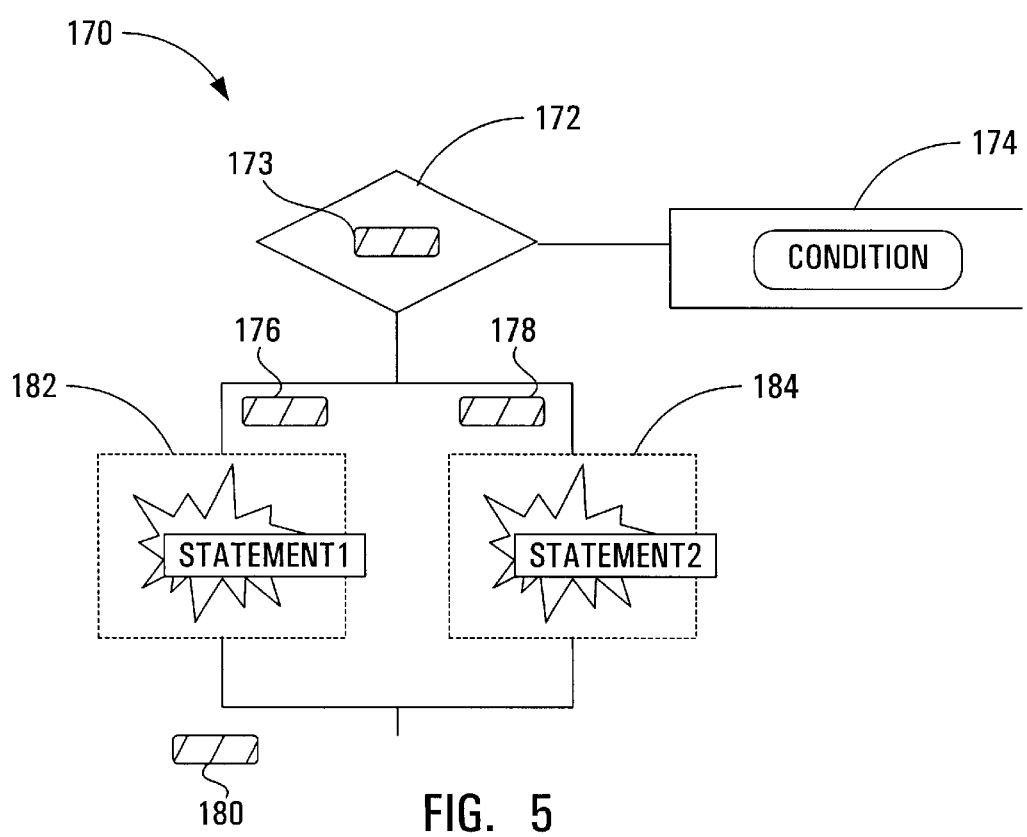
Figure 5:
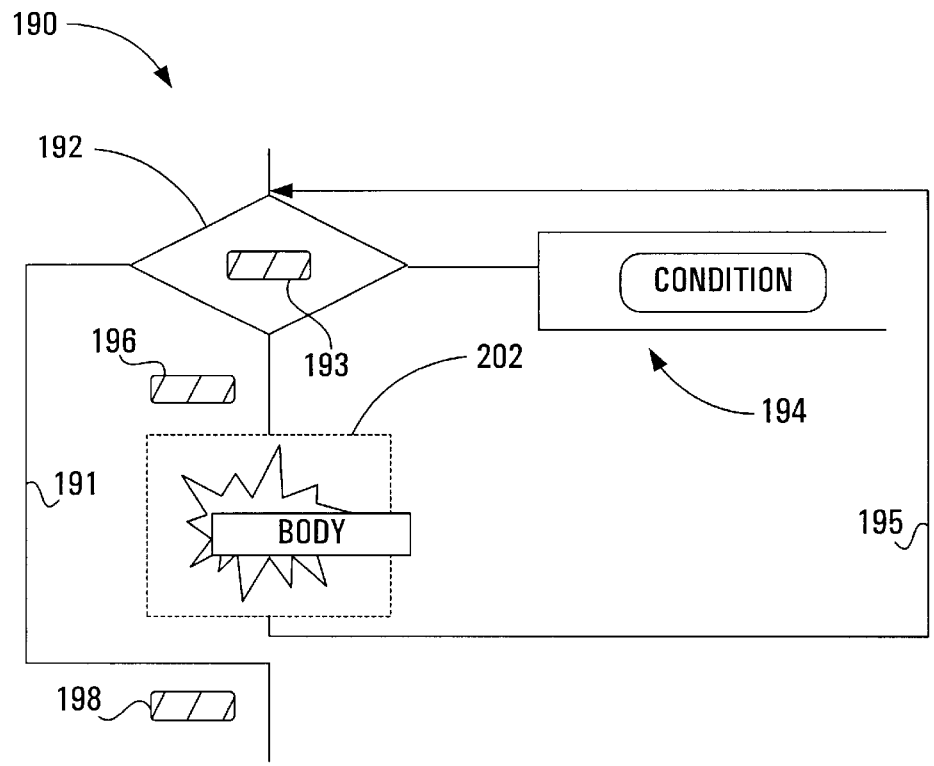
Figure 5:
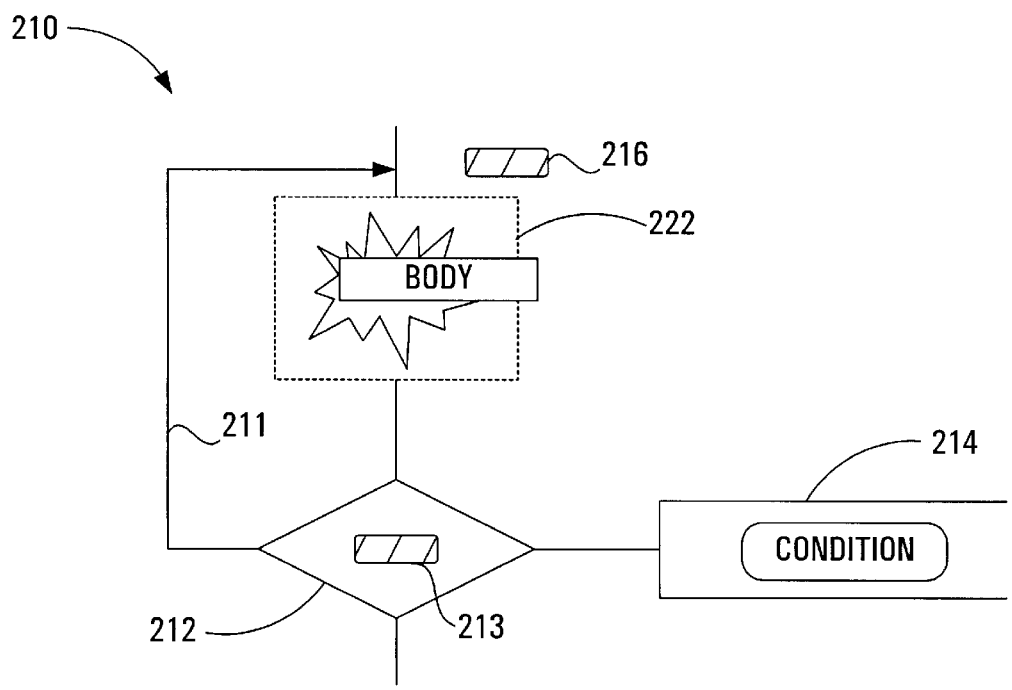
Figure 5:
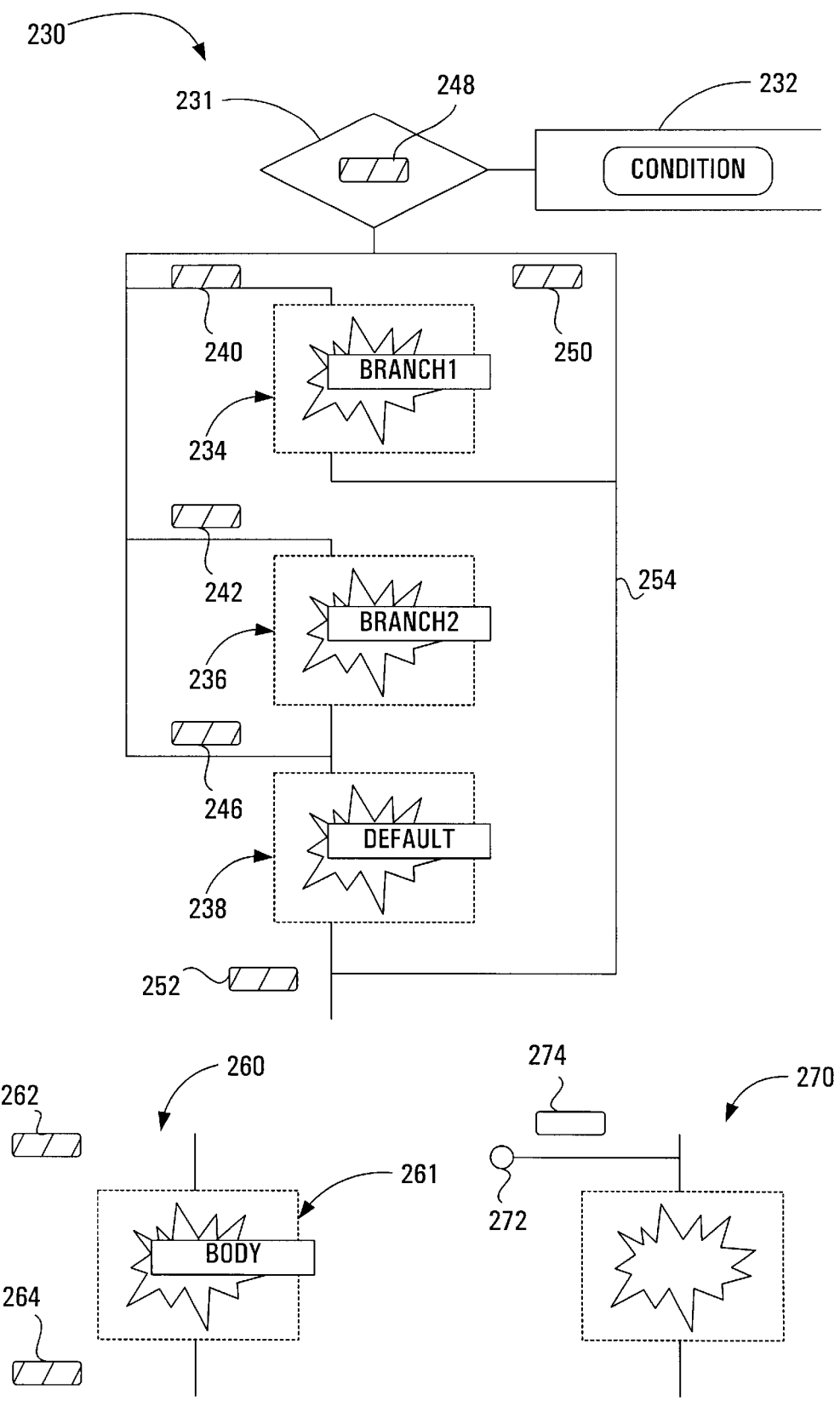

FIG. 5 illustrates a set of composite patterns, which can be contained in the procedure diagram. A single branch conditional pattern is generally indicated by 150 and is used to represent a conditional statement in the short form (if..then). A rhomb 152 is indicative of the start of a conditional pattern. There is an open rectangle 154 labelled "condition" which contains the text of the boolean expression in the if-part of the conditional. There is a nested socket 162 labelled "statement" which corresponds to the then-part of the conditional statement. This pattern contains predefined text labels 153, 158, and 160 which might for example contain the text "IF", "THEN" and "ENDIF" respectively.

A full conditional pattern is generally indicated by 170 and is used to represent a conditional statement with two branches, for example in the form (if..then..else). A rhomb 172 is indicative of the start of a conditional pattern. There is an open rectangle 174 labelled "condition" which contains the text of the boolean expression in the if-part of the conditional. There is a nested socket 182 labelled "statement1" which corresponds to the then-part of the conditional statement. There is a second nested socket 184 labelled "statement2" which corresponds to the else-part of the conditional statement. This pattern contains predefined text labels 173, 176, 178, and 180 which might for example contain the text "IF", "THEN", "ELSE" and "ENDIF" respectively.

A loop pattern is generally indicated by 190 and corresponds to loops with preconditions (for and while-loops). A rhomb 192 is indicative of the start of a conditional pattern. There is an open rectangle 194 labelled "condition" which contains the text of the boolean expression in the pre-condition part of the loop. There is a nested socket 202 labelled "body" which corresponds to the body of the loop. This pattern contains predefined text labels 193, 196, 198 which might for example contain the text "WHILE", "DO", "END-DO" respectively. The left vertical line 191 corresponds to the exit from the loop. The right line 195 corresponds to the continuation of the loop.

A repeat-until loop pattern is generally indicated by 210 and corresponds to loops with postconditions (do-until loops). The pattern starts with a nested socket 222 labelled "body" which corresponds to the body of the loop which is always executed at least once. A rhomb 212 is indicative of the conditional and has an open rectangle 214 labelled "condition" which contains the text of the boolean expression in the post-condition part of the loop. This pattern contains predefined text labels 213, 216, which might for example contain the text "DO", "UNTIL" respectively. The left vertical line 211 corresponds to the continuation of the loop.

The switch pattern is generally indicated by 230 and corresponds to the switch construct. A rhomb 231 is indicative of the start of a conditional pattern. There is an open rectangle 232 labelled "condition" which contains the text of the boolean expression under test. Depending upon the result of the test, in this example one of three branches are taken. One branch has a nested socket 234 labelled "branch1", another branch has a nested socket 236 labelled "branch2", and another branch has a nested socket 238 labelled "default". Each branch of a switch statement may result in an exit from the switch as in branch1 (for example break statement in C), or a fall-through to the next branch of the switch as in branch2 (for example absence of a break statement in C). There may be an exit path 254 which results in all of the branches being skipped. The nature of the flow between the branches is specified by the flow of the connecting lines. It can be seen that there may be many different specific patterns for a switch. Each branch starts with a text region 240,242,246 corresponding to the label of that branch. This pattern also uses some predefined labels 248, 250,252 which may for example contain the text "SWITCH", "EXIT" and "END".

A block pattern is generally indicated by 260 and corresponds to a block statement. It contains a single nested socket 261 labelled "Body" which correspond to the body of the block. This pattern uses some predefined labels 262, 264 which may for example contain the text "block", "endblock" or "{" and "}" for example.

A labelled statement pattern is generally indicated by 270 and corresponds to a labelled statement. This is represented by a circle 272 and a text region 274 containing the text of the label (represented as a solid grey oval). There is a nested socket 276 labelled "statement" which corresponds to the labelled statement.

The primitive patterns of procedure diagrams will now be described with reference to FIG. 6. The local data declaration primitive pattern is generally indicated by 300 and corresponds to local data declarations which might appear in blocks for example. The pattern consists of a rectangle 302 with an open rectangle 304 containing text labelled "Declarations" which contains the text of one or many data declarations. Multiple local data declarations can be merged into a single region. This pattern uses a predefined label 306 which may for example contain the text "dcl".

A task primitive pattern is generally indicated by 310 and corresponds to assignment statements. The pattern consists of a rectangle 312 with an open rectangle 314 containing text labelled "statements" which contains the text of one or many assignment statements. Multiple assignment statements can be merged into a single region. This pattern uses a predefined label 316 which may for example contain the text "task".

A procedure call primitive pattern is generally indicated by 320 and corresponds to a procedure call statement. The pattern consists of a rectangle with two double sides 322 with an open rectangle 324 containing text labelled "parameters" which contains the name of the procedure being called and the actual parameters of the procedure call. optionally, the name of the procedure can be used in a text region 326.

A return primitive pattern is generally indicated by 330 corresponds to a return statement. The pattern consists of a return symbol 332 with an open rectangle 334 containing text labelled "expression" which corresponds to the return expression.

A goto primitive pattern is generally indicated by 340 and corresponds to any statement which results in unconditional transfer of control (e.g. break, continue, goto statements). The pattern consists of a circle 342 and a text region 344 labelled "label" which corresponds to the name of the statement or to the label in a goto statement for example.

A macro call primitive pattern is generally indicated by 350 corresponds to a macro call statement. The pattern consists of a rectangle with one double side 352 with an open rectangle 354 containing text labelled "parameters" which contains the name of the macro being called and the actual parameters of the macro call. Optionally, the name of the macro can be used in a text region 356.

The comment primitive 360 is the same as that described previously in the context of section primitive patterns.

FIG. 7 illustrates the set of display primitives, which can be used to produce the actual graphical diagrams from nested pattern expressions with layout attributes. The suggested set of display directives can be easily implemented in any graphical language (e.g. Postscript, Java, Tk, etc.). The suggested set of display directives is used as an example. The actual appearance of the display directives can vary. The suggested set of directives is not necessarily the minimal set of graphical primitives, which can be used to produce graphical images of diagrams.

The vertical line display primitive 50 is defined by four attributes, namely StartH, StartV, EndV, and Colour. StartH specifies the horizontal position of the starting point of the line. StartV specifies the vertical position of the starting point of the line. EndV specifies the vertical position of the end point of the line. Colour specifies the colour of the line.

The horizontal line display primitive 52 is defined by five attributes, namely StartH, StartV, EndH, Colour, and Dash. StartH specifies the horizontal position of the starting point of the line. Startv specifies the vertical position of the starting point of the line. EndH specifies the horizontal position of the end point of the line. Colour specifies the colour of the line. Dash specifies whether the line is dashed or not.

The text line display primitive 54 is defined by three attributes, namely PosH, PosV, and String. PosH specifies the horizontal position of the beginning of the first character of the text. PosV specifies the vertical position of the first character of the text. String specifies the contents of the text.

The rectangle display primitive 56 is defined by five attributes, namely PosH, PosV, Width, Height, and colour. PosH specifies the horizontal position of the upper left corner of the rectangle. PosV specifies the vertical position of the upper left corner of the rectangle. Width specifies the width of the rectangle. Height specifies the height of the rectangle. Colour specifies the colour of the rectangle.

The open rectangle display primitive 58 is defined by five attributes, namely PosH, PosV, Width, Height, and Dash. PosH specifies the horizontal position of the upper left corner of the open rectangle. PosV specifies the vertical position of the upper left corner of the open rectangle. Width specifies the width of the open rectangle. Height specifies the height of the open rectangle. Dash specifies the whether the open rectangle is made of dashed lines or not.

The rectangle with one double side display primitive 60 is defined by four attributes, namely PosH, PosV, Width, and height. PosH specifies the horizontal position of the upper left corner. PosV specifies the vertical position of the upper left corner. Width specifies the width of the figure. Height specifies the height of the figure.

The rectangle with two double sides display primitive 62 is defined by four attributes, namely PosH, PosV, Width, and height. PosH specifies the horizontal position of the upper left corner. PosV specifies the vertical position of the upper left corner. Width specifies the width of the figure. Height specifies the height of the figure.

The rectangle with a folded corner display primitive 64 is defined by four attributes, namely PosH, PosV, Width, and height. PosH specifies the horizontal position of the upper left corner. PosV specifies the vertical position of the upper left corner. Width specifies the width of the figure. Height specifies the height of the figure.

The rhomb display primitive 66 is defined by four attributes, namely PosH, PosV, Width, and height. PosH specifies the horizontal position of the left corner of the rhomb. PosV specifies the vertical position of the left corner of the rhomb. Width specifies the width of the rhomb. Height specifies the height of the rhomb.

The circle display primitive 68 is defined by two attributes, namely PosH and PosV. PosH specifies the horizontal position of the centre of the circle. PosV specifies the vertical position of the centre of the circle.

The return display primitive 70 is defined by two attributes, namely PosH and PosV. PosH specifies the horizontal position of the centre of the figure. PosV specifies the vertical position of the centre of the figure.

The start display primitive 72 is defined by four attributes, namely PosH, PosV, Width, and Height. PosH specifies the horizontal position of the upper left corner of the figure. PosV specifies the vertical position of the upper left corner of the figure. Width specifies the width of the figure. Height specifies the height of the figure.

The ground display primitive 74 is defined by two attributes, namely PosH, and PosV. PosH specifies the horizontal position of the centre of the figure. PosV specifies the vertical position of the centre of the figure.

Formal Specification of the Pattern Language

The first step in developing a graphical representation of source code is to translate the source code into a pattern language provided by an embodiment of the invention. The pattern language is an intermediate language between the source code and the full graphical representation which is source language independent. Of course, the process of translating from an actual source language to the intermediate language will be source language dependent.

A formal specification of the pattern language will now be presented. The pattern language captures some essential structural characteristics of the graphical patterns. An algebraic specification notation is used. Each algebraic specification is a set of types (sorts), and a set of constructor functions, which can be used to create values of these types. A type describes a category of similar entities. Each is a collection of many (possible an infinite number of) entities. Each entity within a type is distinct from others, yet all entities share some common characteristics. In the case of our graphical patterns, these characteristics include the visual appearance (as presented in FIGS. 3 and 4 described above and layout attributes (as presented in further detail below. Constructors are used to uniquely represent individual entities. Each constructor can have parameters. In the terminology of graphical patterns, parameters correspond to regions and nested sockets. Constructors with parameters capture the idea that one graphical pattern can be contained within other graphical patterns, thus resulting in potentially very complex diagrams.

The provided algebraic specification of the pattern language introduces a concise textual notation to describe the structural properties of graphical diagrams. It also describes the so-called "well-formedness" rules for graphical diagrams by providing formal guidelines to how diagrams could be built. In general, there is a one-to-one relationship between elements of visual diagram language (referred to as graphical patterns) and constructors. Constructor terms (expressions, containing nested constructors) uniquely describe complex diagrams. The specification uses the following typesetting conventions:

MyType—the name of the type

Constructor—the name of the constructor function

Notation F: T1Type, T2Type→T3Type defines constructor F such that the domain of constructor F is a type of type <T1Type, T2Type> and that it creates a value of type T3Type.

Section Diagram Specification

The pattern language for section diagrams is a type S=<Ts,Σs>, where Ts is a particular set of subtypes defined below, and Σs is a set of rules defined below for combining the subtypes in Ts.

The set of subtypes Ts used in the pattern language for section diagrams is:

Ts={TextType, SectionDiagramType, DeclListType, DeclType}.

The TextType type applies to any textual regions within graphical patterns. The SectionDiagramType is a type which corresponds to a Section Diagram pattern, the ultimate product of the language specification for section diagrams. The type DeclListType is a grouping/vertically stacked list of primitive patterns. Each individual primitive pattern of a section diagram pattern is of the type DeclType (see FIG. 4). Entities of type DeclType include: Data Definition, Procedure Definition, Macro Definition and Comment patterns.

The set of rules Σs for combining the above four subtypes in the pattern language for section diagrams is:

Σs={
   Section: TextType, DeclListType→SectionDiagramType
   DataDecl: TextType→DeclType
   ProcDecl: TextType, TextType→DeclType
   MacroDecl: TextType, TextType→DeclType
   Comment: TextType→DeclType
   DeclList: DeclType, DeclListType→DeclListType
   DeclList: DeclType→DeclListType
}

The rules consist of constructors which act upon one or more entities of the allowed types (those belonging to Ts) to produce another entity of one of the allowed types.

The first constructor, Section relates to a Section pattern 100 of FIG. 3. It takes an entity of type TextType and an entity of type DeclListType, and creates an entity of type SectionDiagramType. The entity of type TextType is the heading field, and the entity of type DeclListType is the list of primitives represented by nested socket 104.

The second constructor, DataDecl relates to the Data Definition pattern. It takes an entity of type TextType and creates an entity of type DeclType. Referring to FIG. 4, the element of type TextType relates to the text within the rectangle with folded corner element 130.

The ProcDecl constructor relates to the Procedure Definition pattern 131 of FIG. 4. Constructor ProcDecl has two parameters. The first parameter, which has type TextType, corresponds to the name region of the Procedure Definition pattern. The second parameter, which is also of type TextType, corresponds to the Signature region of the Procedure Definition pattern.

The MacroDecl constructor relates to the Macro Definition pattern 135 of FIG. 4. Constructor MacroDecl has two parameters. The first parameter (of type TextType) corresponds to the Name region of the Macro Definition pattern. The second parameter (also of type TextType) corresponds to the Body region 138 of the Macro Definition pattern.

The Comment constructor relates to the Comment pattern 140 of FIG. 2. A parameter of type TextType corresponds to the Comment region of the Comment pattern.

The DeclList constructor relates to the grouping of primitive patterns. This corresponds to the nested socket 104 in the Section Diagram of FIG. 1.

The above specification of Section Diagrams emphasises the distinction between type TextType and the other three types (SectionDiagramType, DeclType, DeclListType) because type TextType is left undefined within the specification, while other types are defined (by mentioning the resulting types of constructors).

Figure 11:
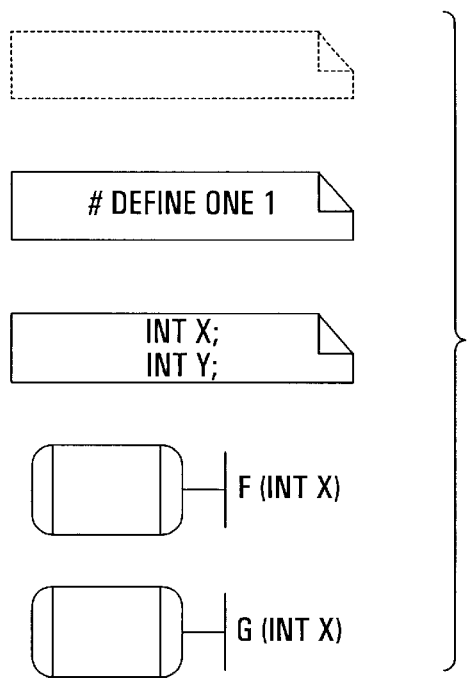
FIGS. 11–14 are examples of graphical diagrams created using systems and methods provided by embodiments of the invention.

For the purpose of illustrating the Section pattern language specification, consider the following small Section module in the C language. The corresponding section diagram for this example is illustrated in FIG. 11.

- - - module MyFile.c - - -
  #define ONE 1
  int x;
  int y;
  /* increment function */
  f(int x) {return x+ONE;}
  /* complex computation */
  g(int x) {return f(x)+y;}

The corresponding specification in pattern language is as follows (where indentation is shown for readability):

Section("MyFile.c",
  DeclList(MacroDecl("ONE", "1"),
  DeclList(DataDecl("int x;"),
  DeclList(DataDecl("int y;"),
  DeclList(Comment("/* increment function */"),
  DeclList(ProcDecl("f","int x"),
  DeclList(Comment("/* complex computation */",
  DeclList(ProcDecl("g","int x"))))))))))

The actual rules for generating the pattern language version of a segment of source code are language dependent and will be described in detail below.

The pattern language specification for procedure diagrams is a type P=<Tp,Σp>, again where Tp is a set of subtypes, and where Σp is a set of constructors using the type defined in Tp.

Tp={
  TextType,
  ProcedureDiagramType,
  StmtListType,
  StmtType,
  BranchType,
  BranchListType
  }
Σp={
  Procedure: TextType, TextType, StmtListType→ProcedureDiagramType
  StmtList: StmtType, StmtListType→StmtListType
  StmtList: StmtType→StmtListType
  Task: TextType→StmtType
  ProcCall: TextType, TextType→StmtType
  Return: TextType→StmtType
  Goto: TextType→StmtType
  MacroCall: TextType, TextType→StmtType
  Comment: TextType→StmtType
  SimpleCond: TextType, StmtListType→StmtType
  FullCond: TextType, StmtListType, StmtListType→StmtType
  WhileLoop: TextType, StmtListType→StmtType
  DoLoop: TextType, StmtListType→StmtType
  Block: StmtListType→StmtType Labelled: TextType, StmtType→StmtType
Switch: TextType, BranchListType→StmtType
BranchList: BranchType, BranchListType→BranchListType
BranchList: BranchType→BranchListType
Branch: TextType, StmtListType→BranchType
}

The specification of the pattern language for procedures can be interpreted in the same manner as that described previously for the pattern language for sections. Procedure diagrams consist of entities, belonging to six different types each of which will briefly be described.

The TextType type is the same as in Section Diagrams. TextType represents textual regions in diagrams.

The ProcedureDiagramType corresponds to top-level procedure diagram.

The StmtListType type corresponds to a vertical stack of procedure diagrams.

The StmtType type corresponds to any of the primitive procedure diagrams (see below).

The BranchType type is a special grouping, corresponding to a branch of a switch statement (see below).

The BranchListType type is a special grouping, corresponding to a set of branches in a switch statement (see below).

Now several of the constructors rules in Σp will be briefly described. The remaining constructors are similarly defined and will not be described in further detail here.

The Procedure constructor relates to the Procedure Diagram 110 of FIG. 3. The first parameter of this constructor corresponds to the Heading region 112 of the Procedure-Diagram pattern. The second parameter corresponds to the Comment region 114. The third parameter corresponds to the Body nested socket 116 of the Procedure Diagram pattern.

Figure 6:
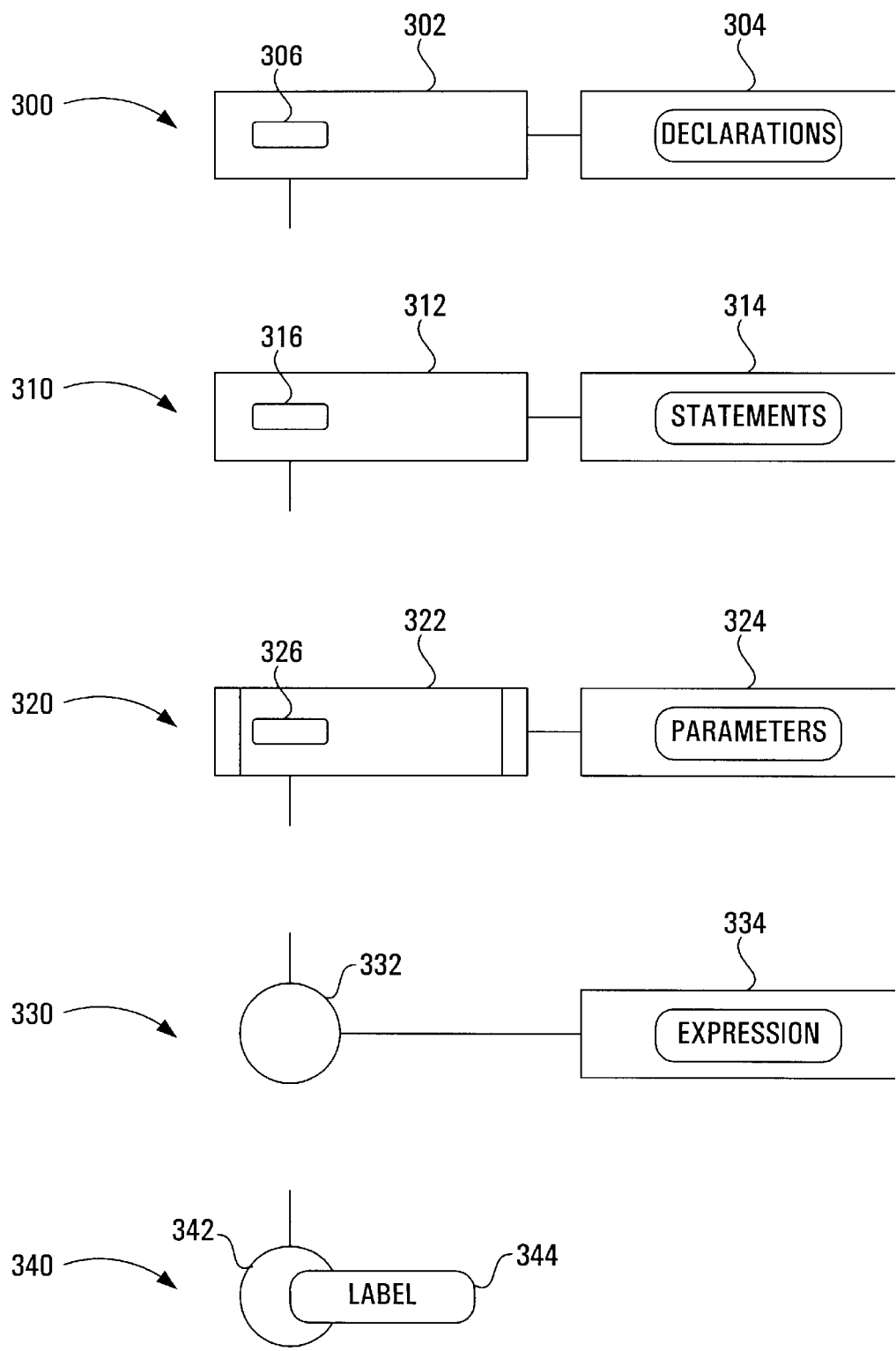
FIG. 6 is an illustration of primitive patterns which can be contained in a procedure diagram.
Figure 6:
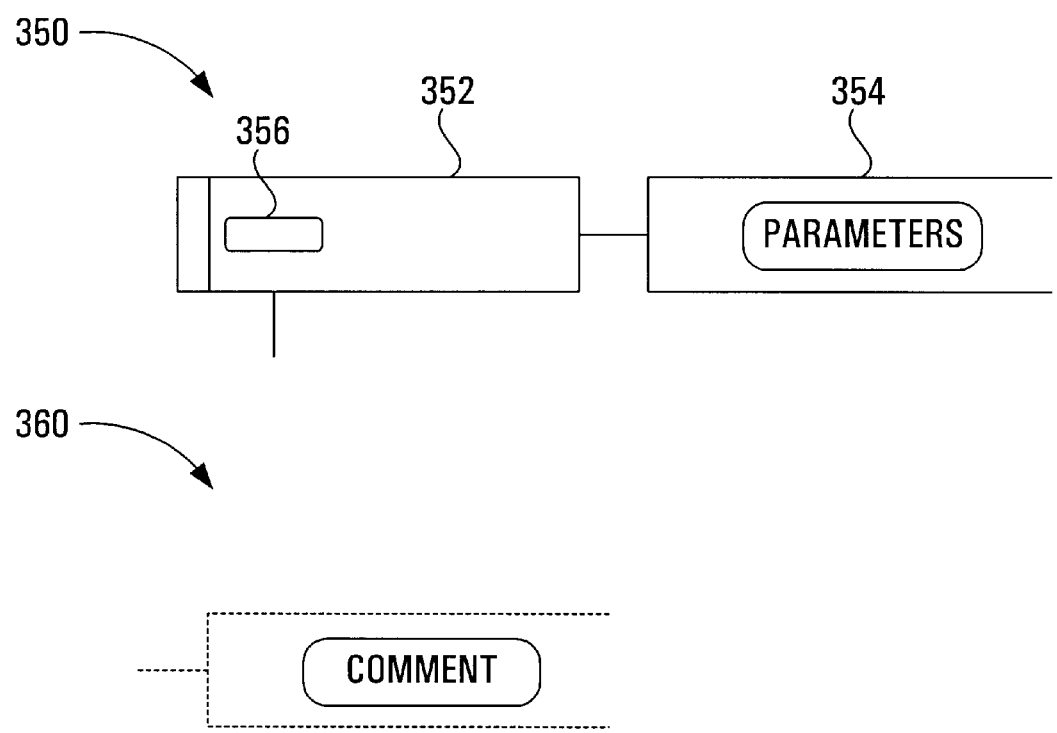

The Task constructor represents the Task pattern 310 of FIG. 6. This constructor has a single parameter which corresponds to the Statements region 314 of the Task pattern.

The ProcCall constructor represents the Procedure Call pattern 320 of FIG. 6. This constructor has a first parameter corresponding to the name of the procedure being called and a second parameter corresponding to the Parameters region 324.

The Return constructor represents the Return pattern 330 of FIG. 6. The single parameter corresponds to the Expression 334 region of the Return pattern.

The Goto constructor represents the Goto pattern 340 of FIG. 6. The single parameter corresponds to the Label region.

Figure 12:
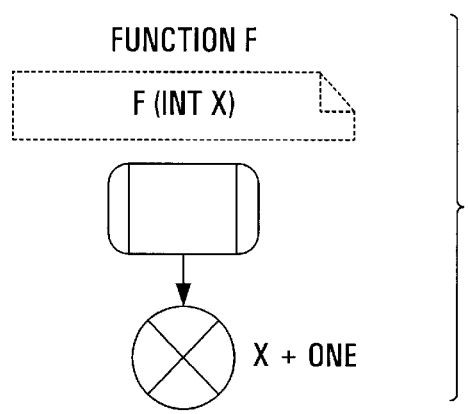
Figure 13:
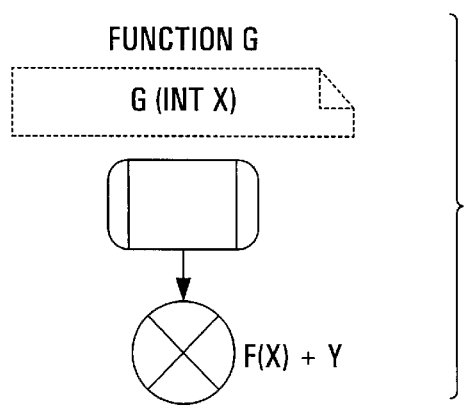
Figure 14:
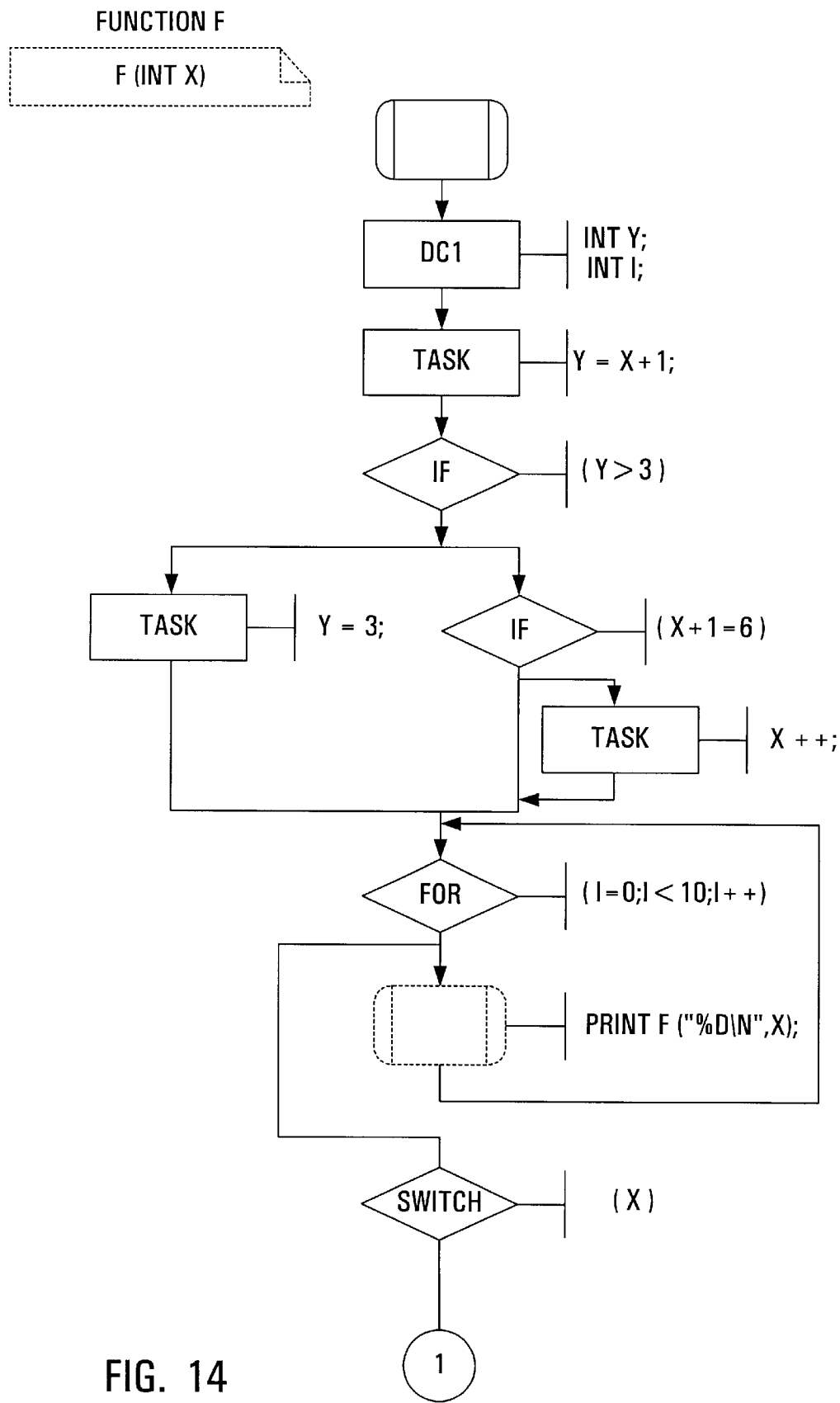
Figure 14:
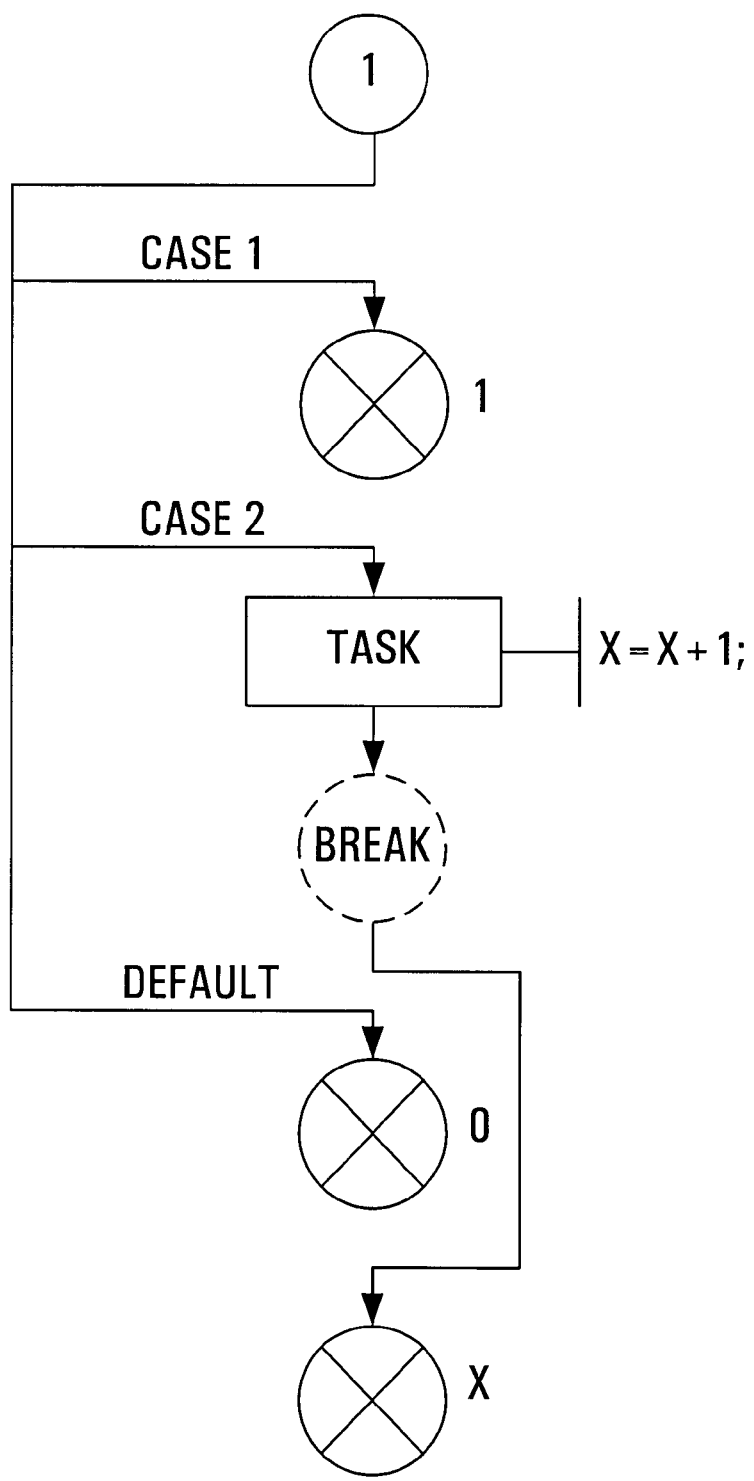

For the purpose of illustrating the Procedure pattern language specification, consider the following small Procedure in the C language. The corresponding section diagram for this example is illustrated in FIG. 12.

```
/* example procedure */
f(int x) {
  int y;
  int i;
  y=x+1;
  if(y>3) y=3;
  else if (x+1==6) x++;
  for(i=0; i<10; i++) {
    printf("%d\n",x);
  }
  /* now switch */
  switch (x) {
    case 1: return 1;
    case 2; x=x+1; break;
    default: return 0;
  }
  return x;
}
```

The corresponding specification in pattern language is as follows (indentation shown for readability):

```
Procedure("F(int x)","/* example procedure */",
  StmtList(DataDecl("int y"),
  StmtList(DataDecl("int I;"),
  StmtList(Task("x=x+1;"),
  StmtList(FullCond("y>3",
    StmtList(Task("y=3")),
    StmtList(SimpleCond("x+1==6",
      StmtList(Task("x++"))),
  StmtList(WhileLoop("for(i=0; i<10; i++)",
    Block(
    StmtList(ProcCall("printf","printf(\"%d\\n\",x))),
  StmtList(Comment("/* now switch */"),
  StmtList(Switch("(x)",
    BranchList(Branch("case 1:",
      StmtList(Return("1"))),
    BranchList(Branch(case 2:",
      StmtList(Task("x=x+1;"),
      StmtList(Labelled("break"))),
    BranchList(Branch("default:",
      StmtList(Return("0")))))),
  StmtList(Return("x")))))))))
```

Formal Specification of Mapping Rules

This section contains a formal specification of mapping rules used to generate nested pattern expressions from the source code constructs. Each mapping rule defines a transformation of a certain syntactic construct into a pattern language expression, which may also contain nested application of mapping rules to parts of the syntactic construct. Each mapping rule has a name and consists of one or many clauses. Each clause contains a left-hand side and a right-hand side. Each mapping rule has a type. The domain of each rule is the syntax of the source language. The range of each rule is the pattern language.

The mapping rules are specific to the source language. This section contains an example of such mapping rules for the C language.

The left-hand side of each mapping clause describes the applicable syntactic pattern as well as the decomposition of that pattern into parts. The left-hand side also provides the naming for the elements of the syntactic pattern.

The right-hand side of the mapping clause describes the resulting pattern expression, which may contain nested applications of mapping rules to parts of the syntactic pattern. Mapping rules assume standard applicative order of execution. First, for the input syntactic expression, the applicable mapping rule is selected. When the rule is selected, the input expression is decomposed into syntactic parts. Then the nested rules are applied to these parts recursively until the complete nested pattern expressions are returned as the result of such applications. Then the final result of the application of the current mapping rule is constructed and returned. It is assumed that the set of rules is unambiguous. Any ambiguities are resolved by applying more specific syntactic patterns first. The set of rules is assumed to be completely covering the syntax of the source language.

The specification of mapping rules uses the following typesetting conventions:

Rule—is the name of a mapping rule

Syntax—is syntactic type or element of syntactic pattern

PatternType—is one of the types of the resulting pattern expression

[syntax]—defines the syntactic pattern (the left-hand side of the mapping clause or the argument of a nested application of some mapping rule in the right-hand side of a mapping clause).

Rule[ ]—is an application of mapping rule Rule to some syntactic pattern.

Constructor—is the name of the pattern constructor of the pattern language.

Notation

Rule[syntax]→Constructor(Rule[syntax]) defines a mapping clause for mapping rule Rule, which transforms source language construct Syntax into pattern language constructor Constructor with a nested application of the mapping rule Rule to the syntactic construct Syntax.

A set of mapping rules for the C language will now be presented by way of example:

Mapping rule G: Program→SectionDiagramType

G[prog-name decl-list]→Section(SN[prog-name], L[decl-list])

Mapping rule G describes how the top-level section diagram pattern is created. Nested application of the mapping rule L transforms the list of definitions within the source language unit into the list of primitive patterns of section diagram.

Mapping rule L: decl-list→DeclListType

L[decl decl-list]→DeclList(D[decl], L[decl-list])

L[decl]→DeclList(D[decl])

Mapping rule L describes how a list of declarations in the source language unit is transformed into a list of primitive patterns of section diagram.

Mapping rule D: decl→SectionPatternType

D[declaration;]→DataDecl(DT[declaration; ])

D[func-headfunc-body]→ProcDecl(FN[func-head], FT[func-head])

D[#define macro-name macro-body]→MacroDecl(MN[macro-name], MT[macro-body])

Mapping rule D describes how individual declarations are transformed into different primitive patterns of the section diagram.

Mapping rule SN:prog-name→TextType

This rule describes the transformation of the source language unit name into the string of text (represented by type TextType).

Mapping rule DT:declaration→TextType

Rule DT describes the extraction of the body of the data declaration as the value of TextType type.

Mapping rule FN:func-head→TextType

Rule FN describes extraction of the name of the function from the function declaration.

Mapping rule FT:func-head→TextType

Rule FT describes extraction of the function heading (e.g. formal parameters and their types) from the declaration of the function.

Mapping rule MN:macro-name→TextType

Rule MN describes extraction of the name of the macro from a macrodefinition.

Mapping rule MT:macro-body→TextType

Mapping rule MT describes extraction of the macro definition body (e.g. macro formal parameters and the macrosubstitution string) from the macro definition.

Mapping rule P:program×name→ProcedureType

P[decl-list decl]×name→E[decl-list]×name

P[decl]×name E[decl]×name

Mapping rule E decl×name→ProcedureType

E[declaration;]×name→

E[func-def]×name→
  where FN[func-def]≠name

E[func-def]×name→M[func-def]
  where FN[func-def]=name

Mapping rule M:func-def→ProcedureType

M[func-def block]→Procedure(FH[func-def], B[block])

Mapping rule B:statement→StmtListType

B[statement]→StmtList(S[statement])

Mapping rule S:statement→StmtType

S[block]→C[block]

S[if (expr) statement1 else statement2]→FullCond(ET[expr],
  B[statement1],
  B[statement2])

S[return expr;]→Return(ET[expr])

The two examples of pattern expressions given previously in the discussion of the section diagram pattern specification language and the pattern diagram pattern specification language were created using the above discussed set of rules. A third example of applying the mapping rules to derive the pattern expression from a source code fragment will now be presented respecting the following source code fragment:

```
myproc()
{
  if(2>3){
    return 0;
  }
  else
    return 1;
}
```

The mapping rules will be applied in the following order.

P["myproc(){if(2>3){return 0;} else return 1;}"], "myproc" results in
  E["myproc(){if(2>3){return 0;} else return 1;}"], "myproc"

E["myproc(){if(2>3){return 0;} else return 1;}"], "myproc" results in
  M["myproc(){if(2>3){return 0;} else return 1;}"] since
  FN["myproc(){if(2>3){return 0;} else return 1;}"] results in "myproc" which is equal to the second parameter of the E-rule.

M["myproc(){if(2>3){return 0;} else return 1;}"] results in
  Procedure(FH["myproc()"],
    B["{if(2>3){return 0;} else return 1;}"]
  )

FH["myproc()"] results in text string "myproc()"

B["{if(2>3){return 0;} else return 1;}"] results in
  StmtList(S["{if(2>3){return 0;} else return 1;}"])

S["{if(2>3){return 0;} else return 1;}"] results in C["{if(2>3){return 0;} else return 1;}"]

C["{if(2>3){return 0;} else return 1;}"] results in
  FullCond(ET["2>3"], B["{return 0;}"], B["return 1;"])

ET["2>3"] results in text string "2>3"
B["{return 0;}"] results in StmtList(S["{return 0;}"])
S["{return 0;}"] results in Return(ET["0"])
ET["0"] results in text string "0"
B["return 1"] results in Return(ET["1"])
ET["1"] results in text string "1"

The resulting pattern expression is provided below (indentation is used to emphasise the structure of the expression).
Procedure ("myproc ()",
  StmtList(
    FullCond("(2>3)",
      StmtList(
        Block(
          StmtList(
            Return("0")))),
      StmtList(
        Return("1")))))

Storage Format for Pattern Language

In order to perform different computations required for the pattern-based visualization of source code, a suitable physical representation of the pattern language needs to be selected. A particularly suitable representation which may be used as part of this invention is described below.

Pattern language is preferably represented and stored as so-called N-ary trees. An N-ary tree is a tree-like data structure consisting of nodes connected via pointers. The conventional linked list is an example of a regular (unary) tree, where each link is connected to only one other node. The conventional binary tree is another example, where each node is connected to exactly two other nodes. N-ary trees consist of nodes of several types. Nodes of each node type may be connected to a different number of other nodes. All nodes belonging to one node type are always connected to the same number of other nodes. N-ary trees include "well-formedness" rules, limiting the node types to which a node of a particular node type can be connected. Another characteristic of an N-ary tree is that each connection is named. Each connection can have different "well-formedness" rules, limiting the allowed node types for this particular connection.

N-ary trees are very suitable for representing the pattern expressions. Each constructor of the pattern language is physically represented by a node type of the N-ary tree. Parameters of constructors are physically represented by connections(pointer fields) to other nodes. Additionally, each node of the n-ary tree has a common field containing a tag which uniquely identifies the node type of this node (and thus—the corresponding constructor of the pattern language).

Figure 15:
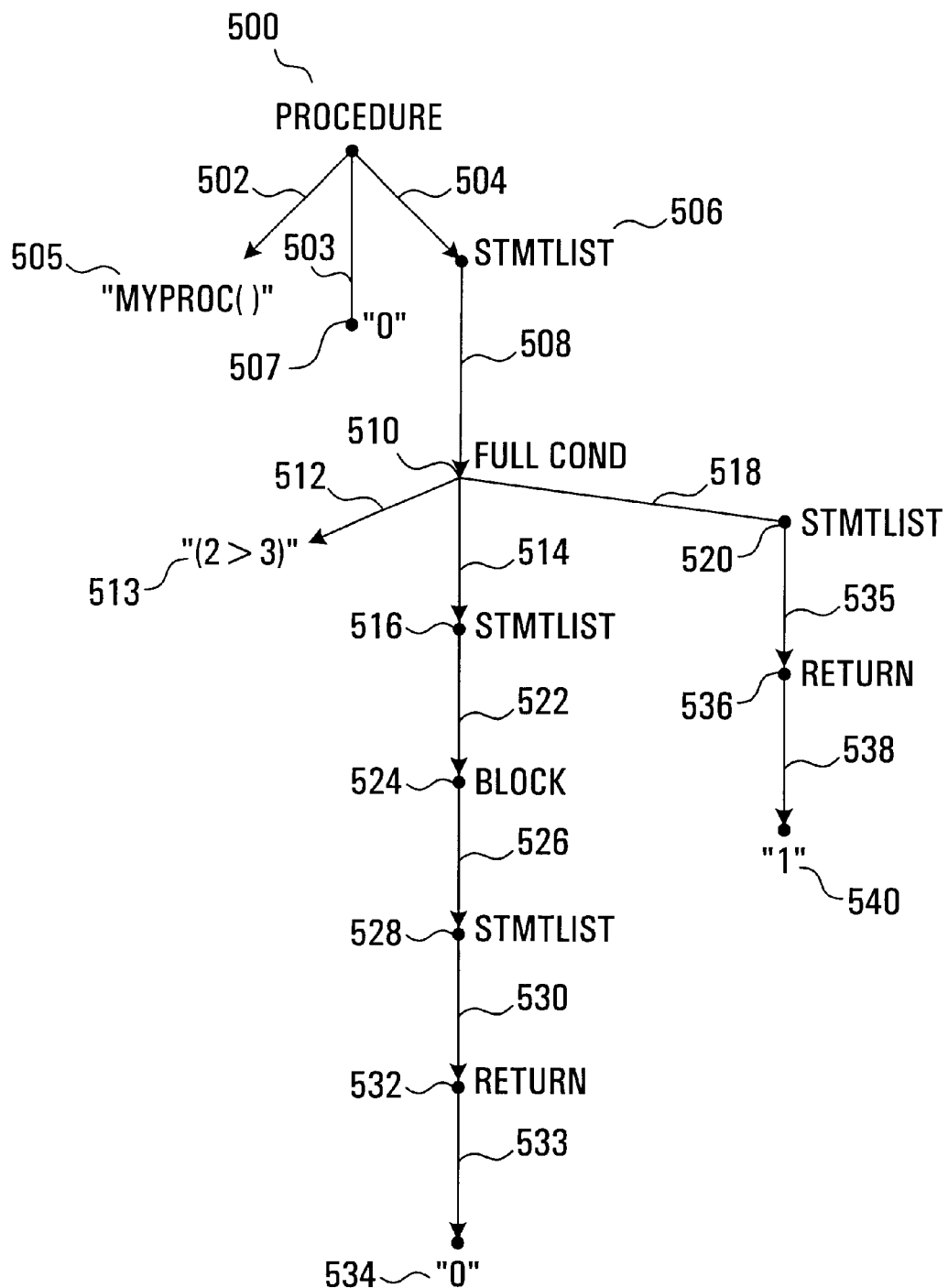
FIG. 15 is an example of an N-ary tree in pictorial form.

N-ary trees will be described in further detail by way of example for the pattern language expression immediately above. An N-ary tree is illustrated in a pictorial manner in FIG. 15 for the above expression. The top level node 500 is a Procedure node having three parameters and hence three pointers 502,503,504. Recall that the Procedure constructor has three parameters these being the Heading of type TextType, the Comment of type TextType, and the Body of type StmtList. Pointer 502 points to the first parameter which is the text field "myproc()" 505, pointer 503 points to the second parameter which is an empty text field 507, and pointer 504 points to the third parameter which is a StmtList node 506. The StmtList node 506 has a single pointer 508 to a single parameter which in this case is the FullCond node 510. The FullCond node 510 has three parameters and hence three pointers, the first 512 pointing to a text field "2>3" 513 representing the conditional test, the second 514 pointing to a first StmtList node 516, and a third 518 pointing to a second StmtList node 520. The first StmtList node 516 has a pointer 522 to a node which is a Block node 524. The Block node 524 has a pointer 526 to a StmtList node 528 which in turn has a pointer 530 to a Return node 532. The Return node 532 points with pointer 533 to a single parameter which is text field "0" 534. The second StmtList node 520 has a pointer 535 to a Return node 536 which in turn has a pointer 538 pointing to a single parameter which is a text field "1" 540.

In the above, there are five node types, namely Procedure, StmtList, FullCond, Block and Return. Each node type is further defined by a node type tag, by how many parameters it expects. Assume that the following node types are defined:

| Constructor | Node type | Number of Parameters |
| --- | --- | --- |
| Procedure | 1 | 3 |
| StmtList | 2 | 2 |
| FullCond | 3 | 3 |
| Block | 4 | 1 |
| Return | 5 | 1 |

In the above table, only node types relating to constructors which appear in the above pattern language expression are included. Of course, it is to be understood that a node type would need to be defined for each different type of constructor.

The above discussed N-ary tree is a data structure which lends itself to the exemplified pictorial presentation. The N-ary data structure in tabular form will be further defined with reference to FIG. 16.

In the N-ary data structure of FIG. 16 the node field 600 contains a node identifier such as an address which can be used to access the particular node. The Node type field 602 is for identifying a particular node as relating to a constructor of one of the types identified above. The Pointer 1 604, Pointer 2 606, Pointer 3 610 fields are for storing pointers to parameters for a particular node. The nesting depth field 612 indicates the level of nesting that the particular node appears at within the pattern language with 0 being the top level, i.e. the first node, and each time a parameter of a node is introduced, that increases the nesting depth by one. The nesting depth field is not essential as the most nested expressions can be determined by other means.

The remaining four fields 614,616,618,620 relate to layout attributes and these will be described in further detail below.

The generation of the above data structure starts with the first constructor appearing in the pattern language expression which in this case is a Procedure constructor, which becomes a node of type 1 and has a nesting depth of 0. A first pointer is stored which points to the location of a text string, the first parameter in the constructor. This is indicated by the notation P>A1, where A1 is the address being pointed to. The text string "myproc()" is stored at address A1, and its nesting depth of 2 is stored. A second pointer is stored pointing to address A5 which stores the empty string "". A third pointer is stored which points to the location of the third parameter which in this case is a StmtList constructor which is stored at address 2 along with its nesting depth of 2.

Next, the fields for the StmtList constructor at node 2 and subsequent nodes are filled in a similar manner resulting in the completed data structure above.

Layout Attributes of a Pattern

Pattern language expressions introduced previously were designed to enable the mapping of source code to source code independent language which is directly mappable onto a graphical diagram layout. Additional information is required to describe the graphical layout of patterns. Information about the layout of graphical diagrams is preferably separated from the information about their structure. Specifically, this is achieved by providing additional attributes for constructors of the pattern language these additional attributes being referred to as layout attributes. The separation of structural issues and layout issues is achieved by introducing an intermediate mapping which changes constructors of the pattern language without layout attributes into equivalent constructors with layout attributes. Layout attributes are left undefined during the mapping from source code to pattern language i.e. during the initial development of the N-ary tree. Then the intermediate mapping fills in the layout attributes. The advantage of such separation is that the intermediate mapping is to a large extent independent from the source language because it only has to compute layout attributes in a pattern expression. On the other hand, all issues of parsing the source code expressions and generating the resulting pattern expression are independent of the details of the layout of resulting diagrams and deal only with the source language.

Figure 8:
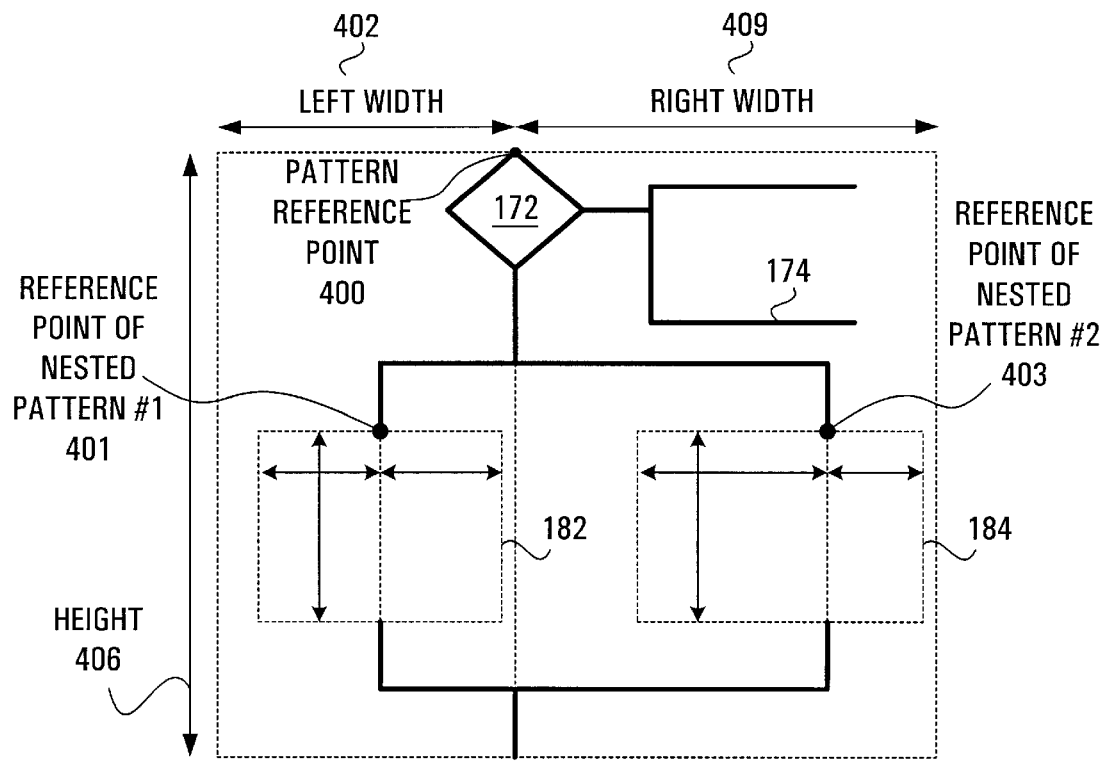
FIGS. 8, 9, and 10 illustrate layout attributes for the full conditional construct.
Figure 9:
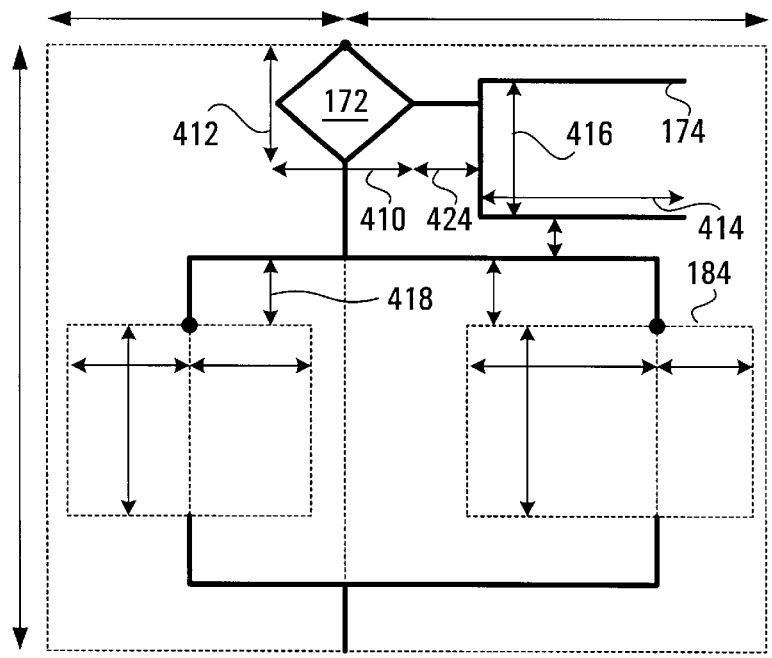

The layout attributes of graphical patterns will be described by way of example with reference to FIGS. 8, 9, and which relate to a FullConditional construct (IF, THEN, ELSE)170 of FIG. 5. Referring firstly to FIG. 8, each graphical pattern occupies a rectangular box, which is characterized by height, width and position. There are four essential graphical characteristics of each graphical pattern which are:

Pattern Reference Point 400—horizontal and vertical coordinates of the specifically selected point at the outer border of the pattern which is used in embedding patterns into nested sockets. This attribute characterizes the position of the pattern.

LeftWidth 402—distance from the reference point to the left side of the pattern box.

RightWidth 404—distance from the reference point to the right side of the pattern box. Note that LeftWidth+ RightWidth specify the total width of the pattern box Height 406—height of the pattern box.

Specifying the left width, the right width, and the reference point actually turns out to include redundant information. More efficiently, the total width, and the reference point can be used to determine the left width and right width.

These attributes become part of the pattern expressions which are stored in the N-ary data structure of FIG. 16. More particularly, they are stored in the following form, for a given construct "Construct":

Construct.Center.w (element 614 of FIG. 16)—specifying the reference point horizontal component;

Construct.Center.h (element 616 of FIG. 16)—specifying the reference point vertical component, the default being zero;

Construct.Size.w (element 618 of FIG. 16)—specifying the width; and

Construct.Size.h (element 620 of FIG. 16)—specifying the height.

Physically, these attributes are stored during the computation of layout attributes by the layout algorithm (see next section).

Figure 10:
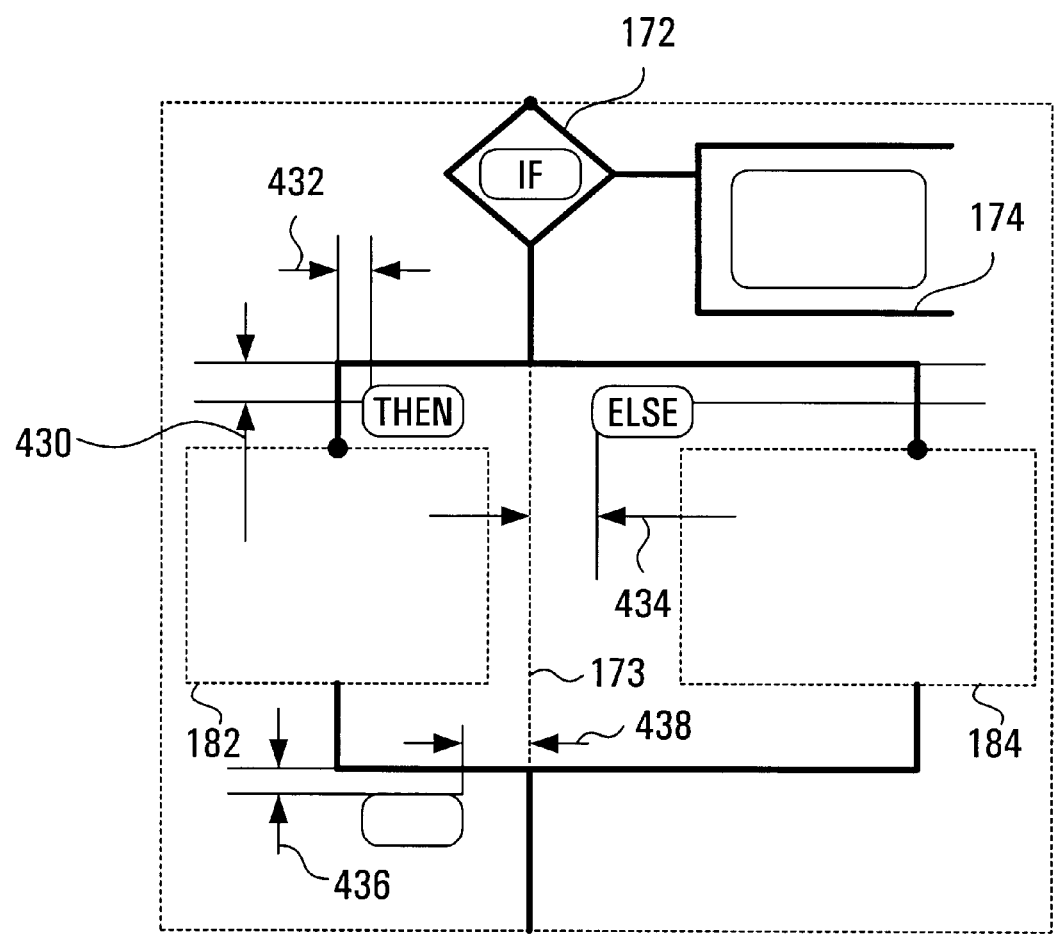

In addition to these layout attribute for each node/pattern, the final layout of a given pattern is characterized by a number of other dimensions. Below is a list of dimensions which may be used to completely describe the visual appearance of the FullConditional pattern. The dimensions are also defined in FIGS. 8, 9 and 10.

dwDecision 410 is the width of the rhomb 172;

dhDecision 412 is the height of the rhomb 174;

dwTextBox 414 is the width of the text box 174;

dhTextBox 416 is the height of the text box 174;

dhStatement1 418 is the minimum vertical distance of any nested socket from a horizontal branch line;

dwStatement1 420 is the minimum horizontal distance of any nested socket statement from the centre line 173 of the construct;

dwLineToText 424 is the length of the line connecting the text box 174;

dwBranch is a default branch width (not shown);

dhBranch is a default branch height (not shown);

dhLab 430 is the minimum vertical distance of any label from any line;

dwLab 432 is the minimum horizontal distance of any label from a vertical branch line;

dwLab2 434 is the minimum horizontal distance of any label from the centre line 173 of the pattern;

dhEndLab 436 is the minimum vertical distance between the end label and the bottom horizontal branch line;

dhEndLab 438 is the minimum horizontal distance between the end label and the centre line 173 of the pattern;

Additional attributes are required for the computation of the main four attributes as well as for the subsequent generation of display primitives (both processes are described below). There are two possible strategies in physical representation of additional attributes.

In the first strategy, the additional attributes are stored in the n-ary tree. The trade-off is that these attributes are computed only once and are used twice. The disadvantage is that they occupy quite a lot of extra space in the physical representation of the n-ary tree.

In the second strategy, the additional attributes are computed each time they are needed. The advantage of this strategy is that no additional space is required, but the attributes are computed twice. This strategy is assumed throughout the rest of the this description.

Layout Algorithm Definition

This section describes how a pattern-based layout algorithm for source diagrams is defined. The pattern-based layout algorithm treats each pattern as an entity without breaking it into individual elements like figures, text and lines.

First, the layout attributes of each pattern are identified and formulae for evaluating these attributes are developed. This is done manually for each pattern. This is performed only once when patterns are defined. Firstly, the layout attributes are defined for each pattern. Layout attributes represent the size of each element of a pattern. Secondly, the layout of each pattern is captured as a set of formulae. Each formula describes how to compute each individual layout attribute for a particular pattern expression, which includes the pattern being described. The computation of layout attributes for composite patterns can only be completed given the complete nested pattern expression because the final sizes of the elements of the given instance of composite pattern depend on the sizes of the nested patterns.

An example set of layout attribute evaluation formulae for the FullConditional pattern will now be presented. The layout attributes for this pattern have been presented previously. The ultimate output of the formulae are the four layout attributes which are to be stored with the N-ary tree for the node relating to the particular construct. Inputs to the formulae are the basic layout attributes computed for the nested patterns and for the labels. Recall that for any stored construct, Construct, the following attributes are stored: Size.w, Size.h, Centre.w, and Centre.h. To associate these attributes with a given construct, the notation Construct.attribute will be used. Thus the inputs to the layout formulae for the FullConditional construct are all of the basic layout attributes of the subconstructs. These inputs are as follows:

For the left nested pattern 182:
- Statement1.Size.w
- Statement1.Size.h
- Statement1.Centre.w
- Statement1.Centre.h For the right nested pattern 184:
- Statement2.Size.w
- Statement2.Size.h
- Statement2.Centre.w
- Statement2.Centre.h For the text in the text box 174
- expr.Size.w
- expr.Size.h
- expr.Centre.w
- expr.Centre.h For the left branch label
- Label1.Size.w
- Label1.Size.h
- label1.Centre.w
- Label1.Centre.h For the right branch label:
- Label2.Size.w
- Label2.Size.h
- Label2.Centre.w
- Label2.Centre.h For the end branch label:
- EndLab.Size.w
- EndLab.Size.h
- Endlab.Centre.w
- Endlab.Centre.h Now, using the above inputs, and the previously defined dimensions, the following are the layout formulae for the FullConditional construct:

FullConditional
LOCAL int Left, Right
Left=max(dwDecision/2,
   dwLab2+Lab1.Size.w+dwLab,
   dwBranch,
   dwStatement1+Statement1.Size.w
   dwEndLab+EndLab.size.w
Right=max(
dwDecision/2+dwLineToText+max(dwTextBox,
   Expr.Size.w),
   dwLab2+Lab2.Size.w+dwLab,
   dwBranch,
   dwStatement1+Statement2.Size.w)
Center.w=Left
Center.h=0
Size.w=Left+Right
Size.h=max(dhDecision,
   dhTextBox,
   Condition.Size.h)
+dhBranch
+dhStatement1+max(Statement1.Size.h, Statement2.size.h)+dhStatement2
+dhEndLab+EndLab.Size.h
}

The outputs of the above formulae are Size.w, Size.h, Center.w and Centre.h which are then stored in the N-ary tree in the node relating to the FullConditional construct.

A similar set of formulae can be defined for each type of construct. The set of formulae for a given construct will depend upon the dimensions of other constructs that it contains, and upon fixed dimensions selected during initial pattern design.

Layout Attributes to Display Directives Mapping

Next a mapping from the computed layout attributes to display directives is defined. The end goal of the visualization process is to get the graphical display of the diagram. To achieve that, a graphical engine is required. The graphical engine should be capable of drawing graphical figures at some sort of graphical device (monitor, printer, plotter, etc.). We assume that the graphical engine is capable of drawing a small set of lines and figures collectively referred to as display primitives.

Display primitives have been summarized in previously with respect to FIG. 7. Below is an algebraic specification of display primitives which uses the same notation introduced earlier for the section and procedure patterns. The display primitives are a type:

D=<Td,Sd> where Td is a set of types, and Sd a set of constructers using the types defined in Td.

Types Td={ColorType,CoordType,DashType, DimensionType,TextType, DisplayType}

The types in Td have the following meaning:

ColorType represents a Color attribute of a display primitive;

CoordType represents horizontal and vertical positions of display primitives;

DashType represents the type of line used in a display primitive (dash or straight);

DimensionType represents width and height attributes of display primitives;

TextType attribute represents string attribute of display primitives;

The following is the set of relevant constructors for display primitives:

Constructors Sd={
   Vertical: CoordType, CoordType, CoordType, ColorType→DisplayType;
   Horizontal: CoordType, CoordType, CoordType, ColorType, DashType—>DisplayType;
   Text: CoordType, CoordType, TextType—>DisplayType;
   Rectangle: CoordType, CoordType, DimensionType, DimensionType, ColorType—>DisplayType;
   Open: CoordType, CoordType, DimensionType, DimensionType, DashType—>DisplayType;

Double: CoordType, CoordType, DimensionType, DimensionType —>DisplayType;

DoubleDouble: CoordType, CoordType, DimensionType, DimensionType—>DisplayType;

Folded: CoordType, CoordType, DimensionType, DimensionType —>DisplayType;

Rhomb: CoordType, CoordType, DimensionType, DimensionType —>DisplayType;

Circle: CoordType, CoordType—>DisplayType;

Return: CoordType, CoordType—>DisplayType;

Start: CoordType, CoordType, DimensionType, DimensionType —>DisplayType;

Ground: CoordType, CoordType—>DisplayType;

Layout Diagram Execution

Figure 2C:
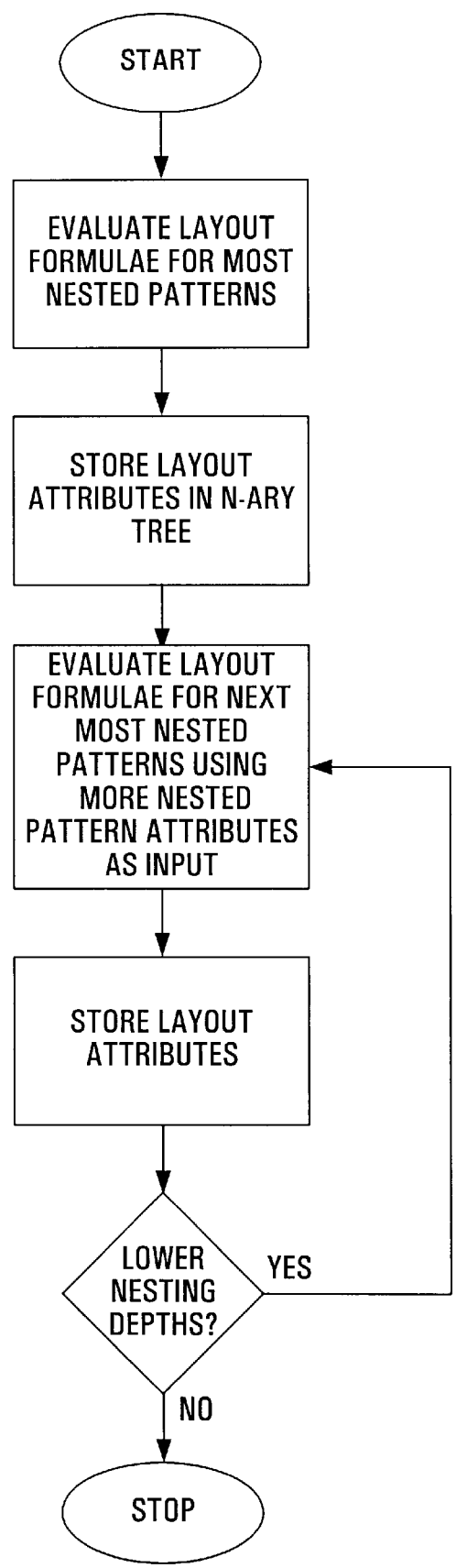
FIG. 2C is a flowchart of the steps executing in computing layout attributes.

The above has described how Layout attribute evaluation formulae as derived and how a Layout Attribute Display Directives Mapping is defined. Referring to FIG. 2C, a flowchart describing how layout attributes are calculated for all patterns in a nested pattern expression. These calculations are done automatically once for each nested pattern expression. Recall that a "nesting depth" parameter was stored with each node of an N-ary tree pattern expression. These innermost patterns of the nested pattern expression are always primitive patterns, so they do not contain any nested patterns and their layout attributes can be finalized without any input to the correspondent attribute evaluation formulae. As computations proceed, some information is propagated from the inner patterns to outer patterns.

Next, the layout attributes for the next highest level of nesting are computed using the computed layout attributes of the higher nested patterns as inputs. Thus the size of the nested patterns is used as the input for layout formulae of lower nested patterns, and the output of the layout formulae is the size of the current pattern.

After the bottom-up computation of layout attributes for the pattern expression is completed, the actual graphical diagram of that nested pattern expression can be created.

The input to the computations of actual display directives are the nested pattern expression with layout attributes computed as discussed previously. The computation of display directives is done automatically by computing positions and sizes as well as some other attributes for each individual element of each pattern.

The generation of display directives is performed in top-down fashion starting from the outermost pattern of the nested pattern expression. The goal of the third phase is to identify the display directives for each pattern as well as to compute positions, sizes and some other attributes of each display directive. Display directives correspond to the individual elements of patterns. Additional attributes of the display directives include the style of line (straight or dashed) and the colour of the element. Additional attributes may vary for different instances of the same pattern.

Display directives are generated from the pattern expression enriched with layout information. The pattern expression contains enough information about what display directives need to be generated (since the set of display directives to be generated depends only on the graphical pattern and the selected set of available display primitives). Parameters to the display primitives are derived both from layout attributes and text attributes of the pattern expression.

Formally, the process of generating display directives from a pattern expression can be specified by a set of mapping rules, similar to the ones, describing generation of pattern expression from source language constructs. However the process of generating display directives is even more simple, since it does not involve any parsing of the input. The reason for that is the straightforward pattern language and storage format for the physical representation of diagrams (described above), which allow instant recognition of the nodes of the N-ary tree and thus the corresponding pattern language constructors.

Display directives are in many ways similar to patterns. One can think of them as "simple micro patterns", or "primitive patterns". Similarities include the following:

display directives have graphical representation (same as patterns);

display directives are formalized as "display directives language" (see above section "Layout Attributes to Display Directives Mapping"). Same algebraic specification style is used.

Transformation from pattern nested expression (enriched with layout attributes) into a "display expression" (i.e. a sequence of display directives) is described by similar "mapping rules", same as the transformation from source code into nested pattern expression.

Some differences between display directives and patterns are as follows:

display directives are never nested;

display directives include such information as placement, coordinates, colors, etc.

According to our principle of "separation of concerns", "display expressions" are much more detailed compared to nested pattern expressions with layout attributes.

Mapping rules from patterns expression with layout into display directives formalize the visual appearance of "graphical patterns", by describing how such pattern can be constructed from similar building blocks (e.g. on screen or as postscript).

In fact these building blocks (or primitives) can be chosen more or less arbitrarily (provided that they can describe the visual appearance of graphical patterns). The most detailed language of display primitives will consist of a single primitive "dot" (but the mapping will be rather complex). A better display language will include lines and arcs.

The language described herein language includes complete figures. This is a trade-off between complexity of a mapping description and "intelligence" of the graphical engine. This also involves performance considerations (like network traffic, when diagram descriptions need to be transferred over network it is beneficial to reduce traffic by making a more "intelligent" graphical engine and transferring more compact descriptions).

A display expression is a SEQUENCE of display directives (separated by ";"). Mapping rules are defined from nested pattern expressions with layout attributes into display expressions. The preferred notation is the same as that for the above described mapping rules from source code into nested patterns expressions. Each rule has a left hand side and a right hand side. The Left hand side is a pattern language expression (with layout attributes). The Right hand side is a display expression (possibly with nested applications of further mapping rules). Again applicative order of evaluation is assumed. Note, that square brackets are used to represent application of a mapping rule to some expression.

Layout attributes are not part of the left hand side of the mapping rule. Instead, they will be used directly in right hand side where needed using the following notation:

xxx.yyy where xxx is the name from the right hand side (matching some construct in pattern expression), and yyy is the name of some layout attribute. This notation is consistent with notation used in attributed grammars. Notation yyy will be used to represent layout attributes of the expression, to which the rule was applied directly (rather than one of its subexpressions).

An example of display directives generated from a pattern expression will be given using the following simple fragment in C:

If(2>3) return 0;

The corresponding pattern expression is provided below.

SimpleCond("(2>3)", Return("0"))

Below is an example of a mapping rule from nested pattern expression with layout attributes into a display expression, corresponding to the above example. This example, Rule S, relates to the translation into a display expression of a SimpleCond pattern language expression Rule S S [SimpleCond (Condition, Stmts)]—>

Rhomb (Centre.w, Centre.h, 10,10);

Text ("if");

Horizontal (Centre.w+10, Centre.h+5,
Centre.w+15, BLACK);

Open (Centre.w+15, Centre.h+5,
Condition.Size.h, Condition.Size.w, SOLID);

Text (Condition);

Vertical (Centre.w+5, Centre.h+10, Centre.h+15, BLACK);

Horizontal (Centre.w+5, Centre.h+12,
Centre.h+12+Stmts.Left+Stmts.Right+3, BLACK);

Text (Centre.w+8, Centre.h+13, "then");

S[Stmts];

Horizontal (Centre.w+5,
Centre.h+12+Stmts.Left+Stmts.Right+3, Centre.h+12, BLACK);

Vertical (Centre.w+5, Centre.h+10,
Centre.h+10+Stmts.Size.h);

Text (Centre.w+8, Centre.h+10+Stmts.Size.h, "endif");

Vertical (Centre.w+5, Centre.h+10+Stmts.Size.h,
Centre.h+10+Stmts.Size.h+2, BLACK);

S[Return (RetExpr)]—>Return (Centre.w, Centre.h);

Text (Centre.w+5, Centre.h+5, RetExpr);

Vertical (Centre.w+5, Centre.h+10, Centre.h+12, BLACK).

The above is a very specific example, and of course, there are many ways of generating display directives from the nested pattern expressions.

Broadly speaking, the invention, in one embodiment provides a stored definition of a set of patterns which can be used for a broad class of imperative programming languages each pattern including a specification of layout attributes, and a number of software modules. Each module might be a function or application program for example, or alternatively the modules collectively might function as a particular application program. There needs to be a module for executing a plurality of mapping rules for generating patterns from source code, a module for executing a plurality of algorithms for computing layout attributes for each pattern, a module for executing algorithms for generating display directives from the patterns and their layout attributes, and a graphical display engine for displaying graphical diagrams by executing the display directives.

Numerous modifications and variations of the present invention are possible in light of the above teachings. It is therefore to be understood that within the scope of the appended claims, the invention may be practised otherwise than as specifically described herein.

For example, above a specific example has been provided using the C source language. It is of course to be understood that the translation from a source language to pattern language will be different for each different source language.

Specific patterns have been defined above for specific pattern language constructs. It is of course to be understood that a different pattern language could be defined which has the same purpose, namely that it is a common intermediary language which can uniformly be mapped onto patterns. Similarly, depending upon the desired physical appearance of the flowcharts, in a other implementations a different set of patterns could be defined.

Furthermore, a particular example of how display directives are computed and implemented has been presented. It is to be understood that within the scope of the invention other implementations of these steps may be used. Furthermore, since graphical display engines are available off the shelf, the step of translating the pattern language and attributes into display directives may be done differently for different display engines. For this reason, the pattern language expressions and their attributes alone constitute an inventive product according to an embodiment of the invention in their own right, as are the methods of generating these.

We claim:

1. A processor implemented method for generating a graphical representation of a source code unit comprising the steps of:

translating a source code unit having a respective source language into a nested pattern language expression, the nested pattern language expression comprising an identification of a nested plurality of pattern language constructors and their parameters;

computing layout attributes for the pattern language constructors in the nested pattern language expression using attribute evaluation formulae;

generating display directives from the nested pattern language, expression and computed layout attributes; and executing display directives to produce the graphical representation;

wherein said step of computing the layout attributes comprises the steps of:

computing the layout attributes by working from most nested pattern language expressions to least nested pattern language expressions; and for each constructor in the pattern language expression layout attribute which allow a determination of a width, height and a pattern reference point for a corresponding graphical pattern using a predetermined set of dimensions and layout attributes of pattern language constructors nested within the pattern language constructor which have been previously computed as inputs.

2. A method according to claim 1 further comprising the step of storing the nested pattern language expression as an N-ary tree.

3. A method according to claim 1 further comprising applying a uniform scaling factor to all of the display directives.

4. An apparatus comprising:

a stored definition of a set of patterns which can be used for a broad class of imperative programming languages each pattern including a specification of layout attributes;

a module for executing a plurality of mapping rules for generating patterns from source code;

a module for executing a plurality of algorithms for computing layout attributes for each pattern;

a module for executing algorithms for generating display directives from the patterns and their layout attributes;

a graphical display engine for displaying graphical diagrams by executing the display directives.

5. An apparatus according to claim 4 further comprising means for scaling the graphical diagrams.

6. An apparatus according to claim 5 comprising a plurality of said module for executing a plurality of mapping rules, each such module executing mapping rules for a particular source language.

7. An apparatus according to claim 4 wherein said module for executing a plurality of mapping rules for generating patterns from source code comprises source code translation means for translating source code into a nested pattern language which is independent of the source language.

8. A method of representing a source code module in a language independent manner comprising the steps of:

translating the source code module into a common intermediary language containing pattern language constructs each having one-to-one correspondence with predefined graphical patterns; and computing attributes of the graphical patterns;

generating display directives as a function of the pattern language, the attributes, and the predefined graphical patterns;

said step of translating the source code module comprises translating the source code module having a respective source language into a nested pattern language expression, the nested pattern language expression comprising a top level pattern language constructor having one or more parameters each parameter in the top level pattern language constructor being a further pattern language constructor;

storing the top level pattern language constructor (or an identifier thereof) in a top node of an N-ary tree together with pointers to nodes representing each of the top level pattern language constructor's parameters, and storing the top level pattern language constructor's parameters in lower level nodes pointed to by these pointers;

recursively identifying parameters of each pattern language constructor in the N-ary tree and storing pointers to these parameters in higher level nodes of the N-ary tree, and storing the parameters in the lower level nodes pointed to by these pointers;

thereby producing the N-ary tree having a number of levels including lowest level nodes which correspond to most nested pattern language constructors and a top level node which corresponds to the least nested pattern language constructor;

for each stored pattern language constructor (or identifier thereof), starting with the lowest level nodes and proceeding in sequence through to the top level node, computing layout attributes for the constructor and storing these layout attributes in the respective node.

\* \* \* \* \*

UNITED STATES PATENT AND TRADEMARK OFFICE
CERTIFICATE OF CORRECTION

PATENT NO.    : 6,346,945 B1
DATED         : February 12, 2002
INVENTOR(S)   : Nikolai Mansurov et al.

It is certified that error appears in the above-identified patent and that said Letters Patent is hereby corrected as shown below:

<u>Title page,</u>
Item [56], References Cited, U.S. Patent No. 5,442,738, delete "08/1995" and insert -- 09/15/1995 --

<u>Column 25,</u>
Line 2, the following line was omitted and should be inserted:
-- by translating a source code unit having a respective source language into a nested pattern language expression, the nested pattern language expression comprising an identification of a nested plurality of pattern language constructors and their parameters; --
Line 4, the following line was omitted and should be inserted:
-- by working from most nested pattern language expressions to least nested pattern language expressions; and --
Line 6, the following line was omitted and should be inserted:
-- wherein for each constructor in the pattern language expression layout attribute which allow a determination of width, height and a pattern reference point for a corresponding graphical pattern a predetermined set of dimensions and layout attributes of pattern language constructors nested within the pattern language constructor are used which have been previously computed as inputs. --

Signed and Sealed this

Fifteenth Day of April, 2003

JAMES E. ROGAN
*Director of the United States Patent and Trademark Office*